(12) United States Patent
Kitazawa et al.

(10) Patent No.: US 11,385,742 B2
(45) Date of Patent: Jul. 12, 2022

(54) POSITION DETECTION METHOD, POSITION DETECTION DEVICE, AND POSITION DETECTION SYSTEM

(71) Applicant: SEIKO EPSON CORPORATION, Tokyo (JP)

(72) Inventors: Takayuki Kitazawa, Suwa (JP); Kensuke Ogasawara, Matsumoto (JP); Yuma Iwahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/177,279

(22) Filed: Feb. 17, 2021

(65) Prior Publication Data

US 2021/0255718 A1 Aug. 19, 2021

(30) Foreign Application Priority Data

Feb. 17, 2020 (JP) .............................. JP2020-024056

(51) Int. Cl.
*G06F 3/042* (2006.01)
*G01B 11/00* (2006.01)
(Continued)

(52) U.S. Cl.
CPC ............ *G06F 3/042* (2013.01); *G01B 11/002* (2013.01); *G06T 7/73* (2017.01); *G06T 2207/10048* (2013.01); *G06T 2207/20084* (2013.01)

(58) Field of Classification Search
USPC ........................................................ 345/175
See application file for complete search history.

(56) References Cited

U.S. PATENT DOCUMENTS

2001/0012001 A1* 8/2001 Rekimoto ............... G06F 3/017
345/173
2001/0028341 A1 10/2001 Kitazawa
(Continued)

FOREIGN PATENT DOCUMENTS

JP 2001-222375 A 8/2001
JP 2003-296026 A 10/2003
(Continued)

OTHER PUBLICATIONS

Li et al., "Algorithm of Fingertip Detection and Its Improvement Based on Kinect," 2017 International Conference on Industrial Informatics—Computing Technology, Intelligent Technology, Industrial Information Integration—4 pages.
(Continued)

*Primary Examiner* — Chineyere D Wills-Burns
(74) *Attorney, Agent, or Firm* — Dority & Manning, P.A.

(57) ABSTRACT

A position detection method of detecting a position in an operation surface pointed by a pointing element, the method including irradiating with infrared light toward the operation surface, obtaining a first and second taken image calibrated with respect to the operation surface by imaging the operation surface with a first and second camera configured to take an image with the infrared light, forming a difference image between the first taken image and the second taken image, extracting an area in which an amount of disparity between the first taken image and the second taken image is within a predetermined range out of the difference image as a candidate area in which an image of the pointing element is included, detecting an area corresponding to a tip position of the pointing element from the candidate area extracted based on a shape of the pointing element, and outputting, based on the area corresponding to a tip position, information representing a pointing position of the pointing element
(Continued)

in the operation surface and whether or not the pointing element had contact with the operation surface.

7 Claims, 26 Drawing Sheets

(51) Int. Cl.
*G06T 7/73* (2017.01)
*G06T 7/593* (2017.01)

(56) References Cited

U.S. PATENT DOCUMENTS

| | | | | |
|---|---|---|---|---|
| 2008/0013826 | A1* | 1/2008 | Hillis | G06F 3/017 |
| | | | | 382/154 |
| 2009/0103780 | A1* | 4/2009 | Nishihara | G06F 3/0425 |
| | | | | 382/103 |
| 2010/0073578 | A1* | 3/2010 | Tan | G03B 21/006 |
| | | | | 353/31 |
| 2011/0242054 | A1* | 10/2011 | Tsu | G06F 3/0425 |
| | | | | 345/175 |
| 2012/0127163 | A1* | 5/2012 | Kim | G06T 5/50 |
| | | | | 345/419 |
| 2012/0249422 | A1* | 10/2012 | Tse | G06F 3/0304 |
| | | | | 345/158 |
| 2013/0088461 | A1* | 4/2013 | Shamaie | G06V 40/107 |
| | | | | 345/175 |
| 2013/0265228 | A1 | 10/2013 | Tamura | |
| 2014/0253513 | A1* | 9/2014 | Matsubara | G06F 3/0425 |
| | | | | 345/175 |
| 2014/0294233 | A1* | 10/2014 | Osamura | G06T 7/593 |
| | | | | 382/103 |
| 2015/0324054 | A1* | 11/2015 | Kobayashi | H04B 10/1141 |
| | | | | 345/175 |
| 2017/0329458 | A1* | 11/2017 | Kanemaru | G06F 3/04883 |
| 2018/0120960 | A1* | 5/2018 | Uchiyama | G03B 17/54 |
| 2018/0275832 | A1* | 9/2018 | Toyooka | G06F 3/0425 |

FOREIGN PATENT DOCUMENTS

| | | |
|---|---|---|
| JP | 2010-072977 A | 4/2010 |
| JP | 2012-048393 A | 3/2012 |
| JP | 2014-142684 A | 8/2014 |
| JP | 2014-153870 A | 8/2014 |
| JP | 2014-202540 A | 10/2014 |
| JP | 2016-014954 A | 1/2016 |
| JP | 2016-218893 A | 12/2016 |
| JP | 2017-219942 A | 12/2017 |

OTHER PUBLICATIONS

Raheja et al., "Fingertip Detection: A Fast Method with Natural Hand," International Journal of Embedded Systems and Computer Engineering, vol. 3, No. 2, Jul.-Dec. 2011—10 pages.

Wang et al., "Efficient Hand Segmentation and Fingertip Detection Using Color Features of Skin and Fingernail," IEICE Trans. Information & Systems, vol. E96-D, No. 8, Aug. 2013—4 pages.

Lee et al., "Region-based corner detection by radial projection," Journal of the Optical Society of Korea, vol. 15, No. 2, Jun. 2011—3 pages.

Dawod et al., "Fingertips tracking based on gradient vector," Int. J. Advance Soft Compu. Appl., vol. 7, No. 3, Nov. 2015—11 pages.

* cited by examiner

POSITION DETECTION METHOD, POSITION DETECTION DEVICE, AND POSITION DETECTION SYSTEM

The present application is based on, and claims priority from JP Application Serial Number 2020-024056, filed Feb. 17, 2020, the disclosure of which is hereby incorporated by reference herein in its entirety.

BACKGROUND

1. Technical Field

The present disclosure relates to a position detection method, a position detection device, and a position detection system.

2. Related Art

In the past, there has been known a device for detecting a position in an operation surface pointed by a pointing element. For example, the device described in JP-A-2016-218893 is provided with a light projection section for projecting pattern light toward an image displayed on a display surface, an imaging section the imaging range of which includes the image, and a processing section for detecting an input operation. The processing section detects the input operation based on a taken image obtained by the imaging section imaging the display surface on which the pattern light is projected, and a taken image obtained by the imaging section imaging the display surface on which the pattern light is projected, and on which the input operation as a pointing input operation has been performed.

However, when detecting the pointing element with a single imaging section, it is difficult to recognize the distance between the pointing element and the operation surface, and it is difficult to determine whether or not an operation has been applied to the operation surface. Therefore, there has been desired to realize a method capable of improving the detection accuracy of the operation by the pointing element using a stereo camera.

SUMMARY

An aspect of the present disclosure is directed to a position detection method of detecting a position in an operation surface pointed by a pointing element, the method including an irradiation step of performing irradiation with infrared light in a direction corresponding to the operation surface, an acquisition step of imaging the operation surface with a first imaging section and a second imaging section different in imaging viewpoint from each other and configured to take an image with the infrared light to obtain a first taken image and a second taken image calibrated with respect to the operation surface, a formation step of forming a difference image between the first taken image and the second taken image, an extraction step of extracting an area in which an amount of disparity between the first taken image and the second taken image is within a predetermined range out of the difference image as a candidate area in which an image of the pointing element is included, a detection step of detecting an area corresponding to a tip position of the pointing element from the candidate area extracted based on a shape of the pointing element, and an output step of outputting information representing a pointing position of the pointing element in the operation surface and whether or not the pointing element had contact with the operation surface based on a detection result in the detection step.

The position detection method described above may be configured such that, in the output step, a first area image of the first taken image corresponding to the candidate area and a second area image of the second taken image corresponding to the candidate area are input to a learned neural network to detect information representing the pointing position of the pointing element in the operation surface and whether or not the pointing element had contact with the operation surface.

The position detection method described above may be configured such that the output step includes a process of inputting data representing a position of the pointing element obtained from the first area image and data representing a position of the pointing element obtained from the second area image to the learned neural network for detecting the pointing position coordinate to obtain a coordinate of the pointing position, and a process of inputting the data representing the position of the pointing element obtained from the first area image and the data representing the position of the pointing element obtained from the second area image to the learned neural network for the contact determination to determine whether or not the pointing element had contact with the operation surface.

The position detection method described above may be configured to further include a learning step of inputting a plurality of the first taken images and the second taken images different in irradiation direction of the infrared light from each other to a neural network to make the neural network learn to make the leant neural network.

The position detection method described above may be configured further such that the detection step includes forming a first difference image having lower resolution than the difference image, and a second difference image having lower resolution than the first difference image, superimposing a figure having a predetermined size on the candidate area in the second difference image to remove the difference image in the candidate area which the figure fits into, removing an image in an area in the first difference image corresponding to the area where the image is removed in the second difference image, superimposes the figure on the candidate area in the first difference image to remove the difference image in the candidate area which the figure fits into, and detecting a tip of the pointing element based on an area where the difference image remains.

Another aspect of the present disclosure is directed to a position detection device adopted to detect a position in an operation surface pointed by a pointing element, the position detection device including an irradiation control section configured to perform irradiation with infrared light in a direction corresponding to the operation surface, an acquisition section configured to image the operation surface with a first imaging section and a second imaging section different in imaging viewpoint from each other and configured to take an image with the infrared light to obtain a first taken image and a second taken image calibrated with respect to the operation surface, a formation section configured to form a difference image between the first taken image and the second taken image, an extraction section configured to extract an area in which an amount of disparity between the first taken image and the second taken image is within a predetermined range out of the difference image as a candidate area in which an image of the pointing element is included, a detection section configured to detect an area corresponding to a tip position of the pointing element from the candidate area extracted based on a shape of the pointing element, and an output section configured to output information representing a pointing position of the pointing element in the operation surface and whether or not the pointing element had contact with the operation surface based on a detection result in the detection section.

Another aspect of the present disclosure is directed to a position detection system including an imaging device including a first imaging section and a second imaging section different in imaging viewpoint from each other and each configured to take an image with infrared light, a detection light irradiation device configured to perform irradiation with the infrared light in a direction corresponding to an operation surface, and a position detection device including an acquisition section configured to obtain a first taken image and a second taken image which are images obtained by imaging the operation surface with the first imaging section and the second imaging section and are calibrated with respect to the operation surface, a formation section configured to form a difference image between the first taken image and the second taken image, an extraction section configured to extract an area in which an amount of disparity between the first taken image and the second taken image is within a predetermined range out of the difference image as a candidate area in which an image of a pointing element configured to perform an operation on the operation surface is included, and a detection section configured to detect an area corresponding to a tip position of the pointing element from the candidate area extracted based on a shape of the pointing element, and an output section configured to output information representing a pointing position of the pointing element in the operation surface and whether or not the pointing element had contact with the operation surface based on a detection result in the detection section.

DESCRIPTION OF AN EXEMPLARY EMBODIMENT

Hereinafter, an embodiment of the present disclosure will be described with reference to the drawings.

A-1. Configuration of Position Detection System

Figure 1:
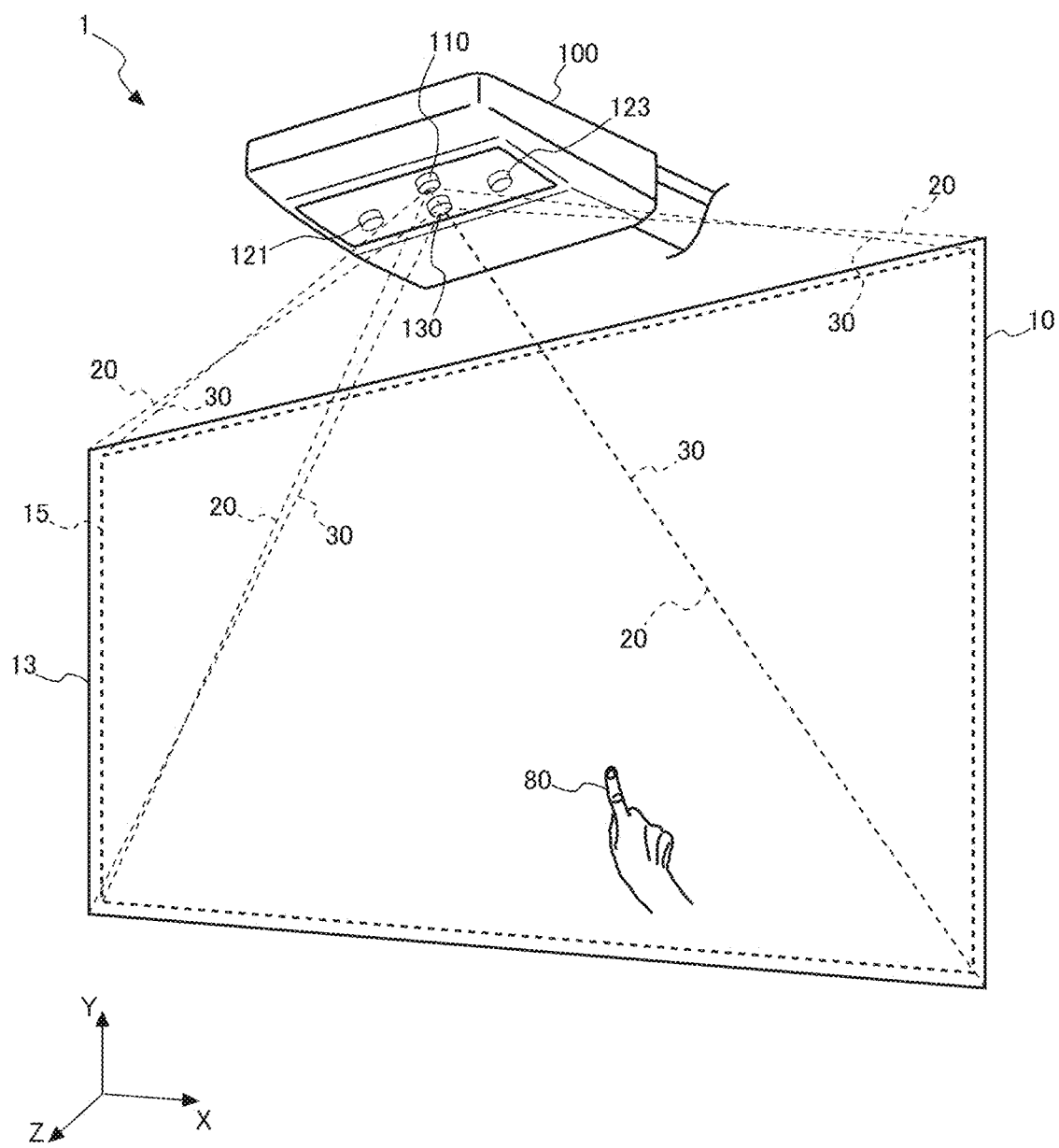
FIG. 1 is a perspective view of an interactive projection system.

FIG. 1 is a perspective view of an interactive projection system 1 as an example of a position detection system.

The interactive projection system 1 is provided with a projector 100 and a projection surface 10 on which the projector 100 projects an image. Hereinafter, the description will be presented assuming a normal direction of the projection surface 10 and a front side of the projection surface 10 as a Z-axis direction, a vertically upward direction along the projection surface 10 as a Y-axis direction, and a direction perpendicular to the Z-axis direction and the Y-axis direction as an X-axis direction. The projection surface 10 corresponds to an X-Y plane with Z=0. The projection surface 10 is a display surface on which image light 30 projected by the projector 100 is displayed, and the projector 100 is an example of a display device.

The projector 100 generates image light 30 corresponding to image data, and then projects the image light 30 thus generated on the projection surface 10. Further, the projector 100 is provided with an interactive function. The interactive function means a function of detecting a position of the operation with a pointing element 80 to the projection surface 10, then displaying an image corresponding to the position or the trajectory of the pointing element 80, or making a change to an image displayed based on the position of the operation thus detected.

The projector 100 is provided with a projection section 110 for projecting the image light 30 from a projection opening, a first camera 121 and a second camera 123 for taking an image of the projection surface 10, and a detection light irradiation section 130 for performing irradiation with detection light 20 used for the detection of the pointing element 80. The first camera 121 corresponds to a first imaging section in the present disclosure, and the second camera 123 corresponds to a second imaging section in the present disclosure.

Although when the projection surface 10 on which the projector 100 projects the image light 30 is a screen formed of a flat surface is described in the present embodiment, a flat surface fixed to a wall surface or the like can also be used as the projection surface 10. Further, it is also possible for the projection surface 10 to be a curtain-like screen of a suspended type, a rising type, or the like. Further, it is also possible to use an indoor wall surface, a white board, a block board, and so on as the projection surface 10. Further, a front surface of the projection surface 10 is used as an operation surface 13 to be used for input of an operation using the pointing element 80.

Figure 2:
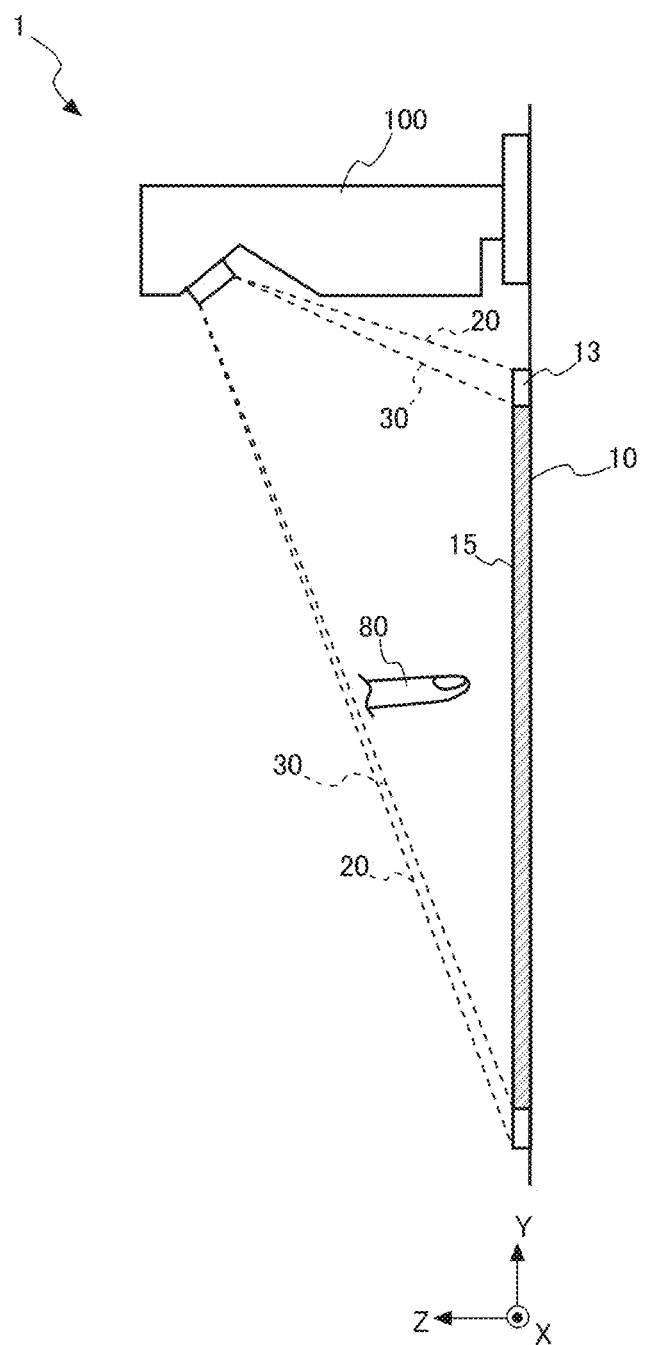
FIG. 2 is a side view showing an installation condition of a projector.

FIG. 2 is a side view of the interactive projection system 1.

The projector 100 in the present embodiment is fixed to the wall surface and is installed in front of and above the projection surface 10, and projects the image light 30 toward the projection surface 10 located on an obliquely downside. An area where the image light 30 is projected by the projector 100 in the projection surface 10 is referred to as a projection area 15. Further, the projector 100 performs irradiation with the detection light 20 in a direction corresponding to the operation surface 13. The detection light 20 is the light used for detecting the pointing element 80, and infrared light is used as the detection light 20 in the preset embodiment. By using the infrared light, it is possible to detect the pointing element 80 without being affected by the image light 30 mainly consisting of visible light, and further, no influence is made on the display with the image light 30. A range including at least a part of the projection surface 10 is irradiated with the detection light 20. In the present embodiment, a range covering the entire area of the projection surface 10 is irradiated. The direction corresponding to the operation surface 13 means a direction in which the operation of the pointing element 80 can be detected by an imaging section 120. More specifically, the direction corresponding to the operation surface 13 means a direction in which reflected light reflected by the pointing element 80 having approached within a predetermined distance from the operation surface 13 can be taken by the imaging section 120.

The first camera 121 and the second camera 123 are disposed at positions different from each other in the projector 100. The first camera 121 and the second camera 123 image the projection surface 10 from respective imaging viewpoints different from each other to thereby function as a stereo camera. In the present embodiment, the first camera 121 is disposed on the left side of the projection section 110 of the projector 100 so as to correspond to the projection surface 10, and the second camera 123 is disposed on the right side of the projection section 110 of the projector 100 so as to correspond to the projection surface 10. The first camera 121 is a left camera, and the taken image by the first camera 121 is referred to as a left taken image. Further, the second camera 123 is a right camera, and the taken image by the second camera 123 is referred to as a right taken image.

The projector 100 images the projection surface 10 with the first camera 121 and the second camera 123 to detect the reflected light as the detection light 20 reflected by the pointing element 80. In the interactive projection system 1, it is possible to use at least one pointing element 80 of a non-light emitting type. As the pointing element 80, it is possible to use a non-light emitting object such as a finger or a pen. The pointing element 80 of the non-light emitting type is not particularly limited providing the infrared light is reflected by the pointing element 80, and in the present embodiment, there is described an example in which a finger of the user is used as the pointing element 80.

The first camera 121 and the second camera 123 are each set so as to be able to image the entire area of the projection surface 10, and each have a function of taking the image of the pointing element 80 with the projection surface 10 as a background. In other words, the first camera 121 and the second camera 123 each receive the light reflected by the projection surface 10 and the pointing element 80 out of the detection light 20 emitted from the detection light irradiation section 130 to thereby form the image including the pointing element 80. When using the two images respectively taken by the first camera 121 and the second camera 123, it is possible to obtain a three-dimensional position of the pointing element 80 using triangulation or the like. It should be noted that the number of the cameras can also be three or more.

A-2. Configuration of Projector

Figure 3:
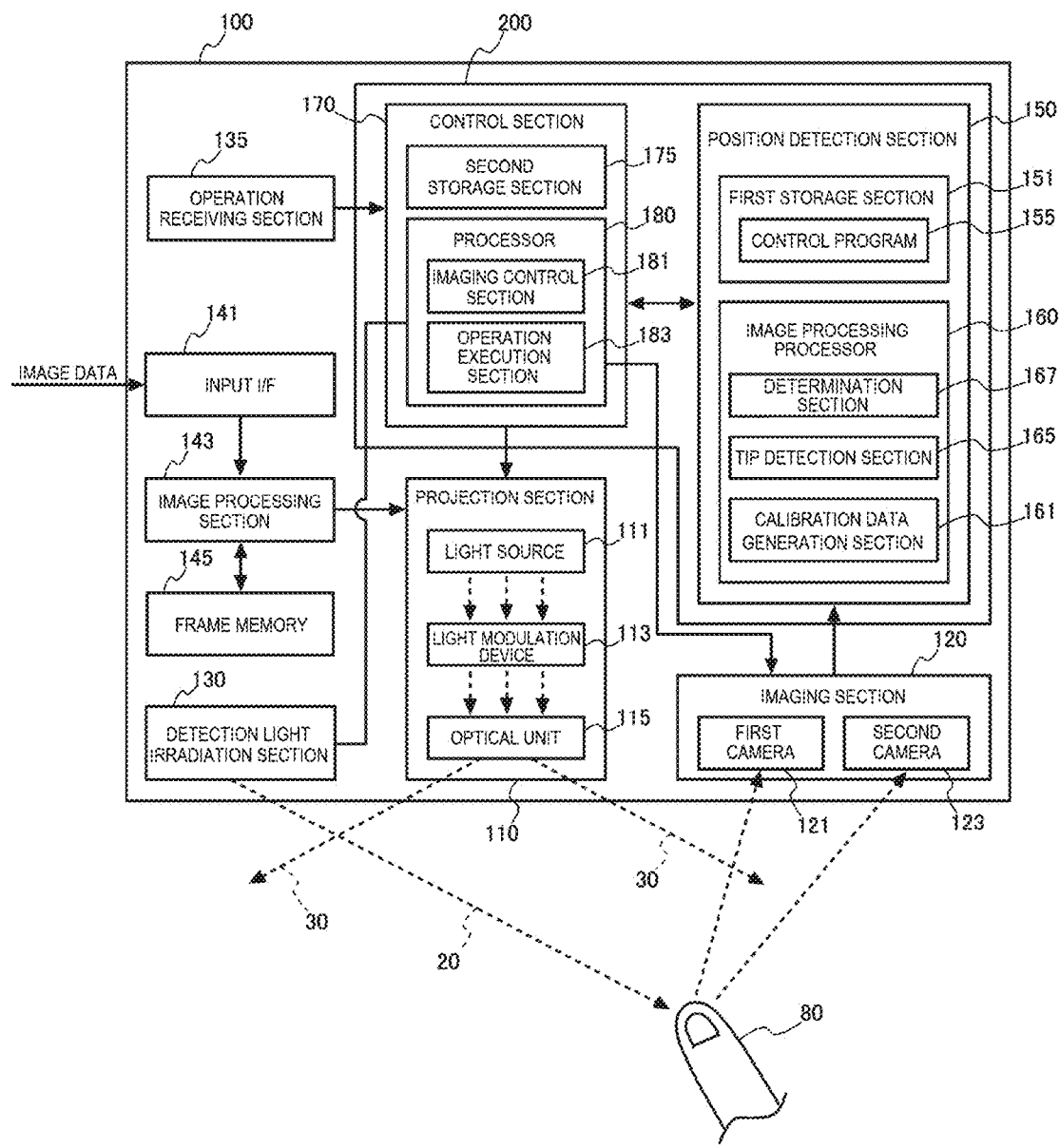
FIG. 3 is a block diagram showing a configuration of the projector.

FIG. 3 is a block diagram showing a configuration of the projector 100.

The projector 100 is provided with the projection section 110, the imaging section 120, the detection light irradiation section 130, an operation receiving section 135, an input interface 141, an image processing section 143, a frame memory 145, a position detection section 150, and a control section 170. The position detection section 150 and the control section 170 operate as a position detection device 200. The projection section 110 is an example of a display section.

The projection section 110 is provided with a light source 111, a light modulation device 113, and an optical unit 115.

As the light source 111, there is used a lamp light source such as a halogen lamp, a xenon lamp, or a super high-pressure mercury lamp. Further, as the light source 111, there can also be used a solid-state light source such as an LED (Light Emitting Diode) or a laser source.

The light modulation device 113 is provided with a light modulation element for modulating light emitted by the light source 111 to generate the image light 30. As the light modulation element, it is possible to use, for example, a transmissive liquid crystal light valve, a reflective liquid crystal light valve, or a digital mirror device.

The optical unit 115 is provided with an optical element such as a lens or a mirror, and projects the image light 30 generated by the light modulation device 113 on the projection surface 10 in an enlarged manner. The image obtained by the image light 30 forming an image on the projection surface 10 is visually recognized by the user.

The imaging section 120 is provided with the first camera 121 and the second camera 123.

The first camera 121 and the second camera 123 are each provided with an imaging element for converting the light collected by the optical system such as a lens into an electric signal such as a CCD (Charge Coupled Device) or a CMOS (Complementary Metal Oxide Semiconductor). The first camera 121 and the second camera 123 are disposed so as to be able to image the reflected light as the detection light 20 reflected by the pointing element 80. Further, to the first camera 121 and the second camera 123, there are attached infrared filters for receiving the reflected light of the detection light 20.

The first camera 121 and the second camera 123 each take an image of a range including the operation surface 13. The first camera 121 and the second camera 123 each take an image of the range including the operation surface 13 at a predetermined frame rate, and then output the taken images thus formed to the position detection section 150. When the user makes the pointing element 80 approach the projection surface 10, the reflected light as the detection light 20 emitted by the detection light irradiation section 130 and then reflected by the pointing element 80 is imaged in the taken image by the imaging section 120.

The detection light irradiation section 130 has an LD (Laser Diode) or an LED as the light source for emitting the infrared light. Further, it is also possible for the detection light irradiation section 130 to be provided with an optical component for diffusing the infrared light emitted by the light source toward the projection surface 10. In the detection light irradiation section 130, it is possible to dispose one emission opening for emitting the detection light 20, and install the emission opening at a position between the first camera 121 and the second camera 123. Further, in the detection light irradiation 130, it is also possible to dispose two or more emission openings, and install the emission openings at positions corresponding respectively to the first camera 121 and the second camera 123. For example, by disposing the emission openings respectively adjacent to the first camera 121 and the second camera 123, and adjusting the timings of light emission and imaging, it is possible to improve the contrast in the taken images.

The operation receiving section 135 receives an infrared signal transmitted by a remote controller not shown. The operation receiving section 135 outputs an operation signal corresponding to the infrared signal thus received from the remote controller to the control section 170. The operation signal is a signal corresponding to a switch of the remote controller operated.

The input interface 141 is a connection interface with an external device. The input interface 141 is provided with a connector to which a cable is coupled and an interface circuit for performing signal processing. The input interface 141 receives image data supplied from the external device coupled. The input interface 141 outputs the image data thus received to the image processing section 143.

The image data thus input is developed in the frame memory 145 by the image processing section 143. The frame memory 145 is formed of, for example, an SDRAM (Synchronous Dynamic Random Access Memory).

The image processing section 143 performs image processing on the image data having been developed in the frame memory 145. In the image processing performed by the image processing section 143, there are included, for example, a resolution conversion process or a resizing process, correction of a distortion aberration, a shape correction process, a digital zooming process, and an adjustment of the color shade or the luminance of the image. The image processing section 143 executes the process designated by the control section 170, and executes the process using a parameter input from the control section 170 as needed. Further, it is obviously possible for the image processing section 143 to execute two or more of the processes described above in combination with each other. The image processing section 143 retrieves the image data from the frame memory 145, and then outputs the image data thus retrieved to the projection section 110.

The image processing section 143 and the frame memory 145 are formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. Further, it is also possible for an analog circuit to be included in a part of the configuration of the integrated circuit, or it is also possible to adopt a configuration having the control section 170 and the integrated circuit combined with each other.

The position detection section 150 is provided with the first storage section 151 and an image processing processor 160.

The first storage section 151 is formed of, for example, a volatile semiconductor storage device, a non-volatile semiconductor storage device, or volatile and non-volatile semiconductor storage devices. The first storage section 151 stores a control program 155 to be executed by the image processing processor 160. Further, the first storage section 151 stores a calibration image 201 and calibration data described later.

The image processing processor 160 is formed of a dedicated processor used for real-time digital image processing such as a GPU (Graphics Processing Unit). Further, the image processing processor 160 can also be formed of, for example, a DSP (Digital Signal Processor), an integrated circuit, or other digital circuits. In the integrated circuit, there are included, for example, an LSI, an ASIC, a PLD, an FPGA, and an SoC.

The position detection section 150 is provided with a calibration data generation section 161, a tip detection section 165, and a determination section 167 as functional blocks. These functional blocks represent the functions realized by the image processing processor 160 executing the command set described in the control program to perform arithmetic operations and control with the blocks for descriptive purposes.

Figure 4:
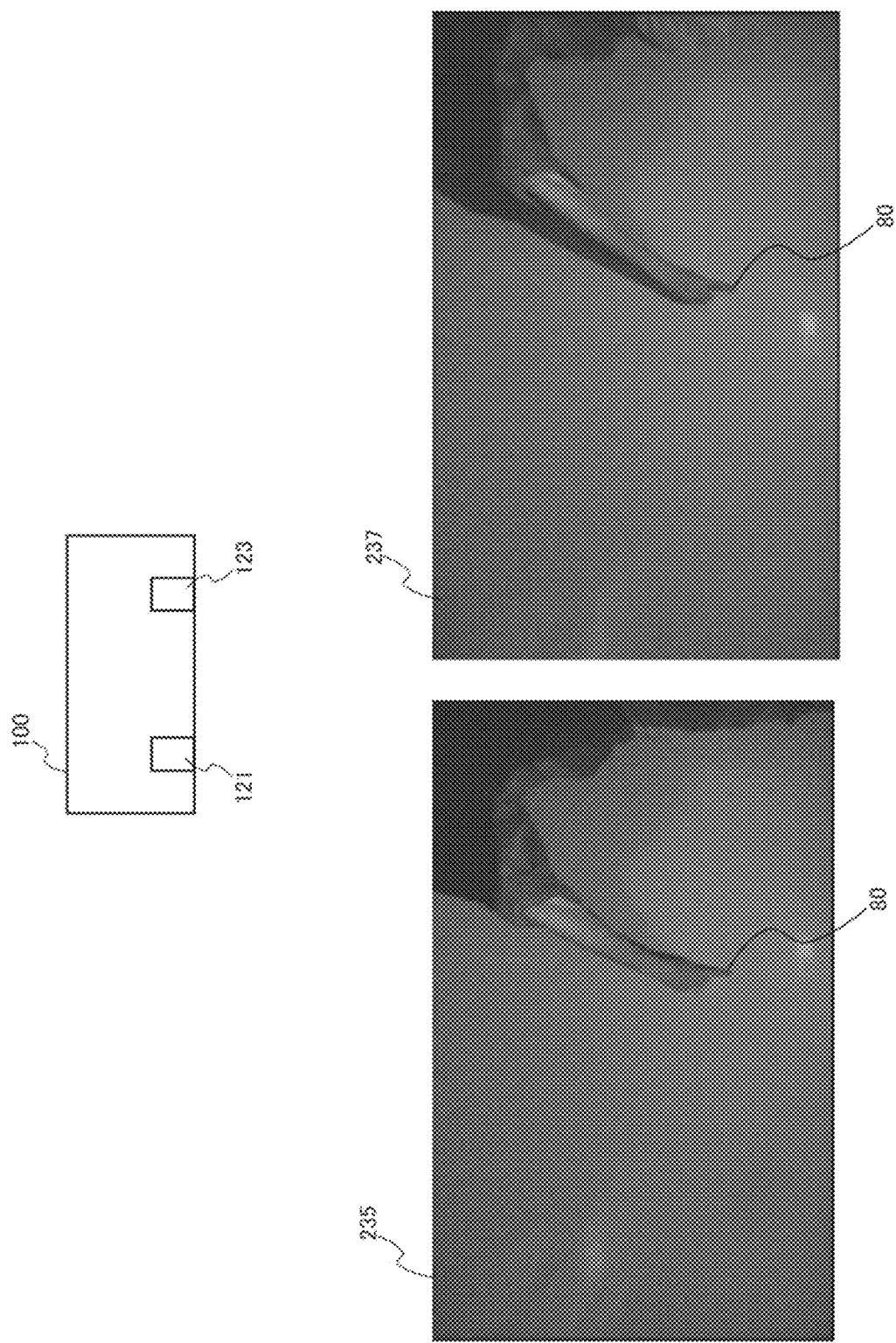
FIG. 4 is a diagram showing a left rectangular image and a right rectangular image.

To the position detection section 150, there are input the left taken image taken by the first camera 121 and the right taken image taken by the second camera 123. FIG. 4 shows an example of the left taken image and the right taken image. The left taken image and the right taken image shown in FIG. 4 are each an image obtained by imaging the finger of the user as the pointing element 80. More specifically, FIG. 4 shows the images respectively obtained by the first camera 121 and the second camera 123 imaging the range including fingers, a hand, and an arm at the same timing with the operation surface 13 as a background. In FIG. 4, there are shown a left rectangular image 235 corresponding to the left taken image by the first camera 121 as a left camera, and a right rectangular image 237 corresponding to the right taken image by the second camera 123 as a right camera. The left rectangular image 235 is an image obtained by deforming the left taken image using the calibration data generated by the calibration data generation section 161. The right rectangular image 237 is an image obtained by deforming the right taken image using the calibration data. The details of the left rectangular image 235 and the right rectangular image 237 will be described later.

The calibration data generation section 161 generates the calibration data. The calibration data includes first range information, second range information, a first image conversion coefficient, and a second image conversion coefficient.

The first range information is information representing a range of the projection area 15 in the left taken image. The second range information is information representing a range of the projection area 15 in the right taken image. The first image conversion coefficient is a coefficient for converting the shape of the image extracted from the left taken image based on the first range information into a rectangular shape. The second image conversion coefficient is a coefficient for converting the shape of the image extracted from the right taken image based on the second range information into a rectangular shape. The details of a method of generating the calibration data will be described later.

The tip detection section 165 corresponds to an acquisition section, an extraction section, and an output section in the present disclosure, and executes a process corresponding to an acquisition step, a formation step, an extraction step, and a detection step in the present disclosure. The acquisition step corresponds to a process including the steps S4, S5, and a part of the step S6 shown in FIG. 5 described later. The formation step includes a process corresponding to the step S6 shown in FIG. 5, in particular to the step S602 shown in FIG. 8. The extraction step includes a process corresponding to the step S6 shown in FIG. 5, in particular to the steps S603 and S604 shown in FIG. 8. The detection step includes a process corresponding to the step S7 shown in FIG. 5.

The process which corresponds to the acquisition step, and is executed by the tip detection section 165 is a process of obtaining the left rectangular image 235 and the right rectangular image 237 which are shown in FIG. 4, and are the taken images calibrated with respect to the operation surface 13. The taken image calibrated with respect to the operation surface 13 means an image adjusted so that the disparity on the operation surface 13 vanishes. The tip detection section 165 clips an image corresponding to the projection area 15 from the left taken image using the first range information, and then converts the image thus clipped into the left rectangular image 235 using the first image conversion coefficient. Further, the tip detection section 165 clips an image corresponding to the projection area 15 from the right taken image using the second range information, and then converts the image thus clipped into the right rectangular image 237 using the second image conversion coefficient. The left rectangular image 235 and the right rectangular image 237 are each a rectangular image, and an image adjusted so that the disparity vanishes at the position where Z=0 is true which is the position of the operation surface 13. Further, regarding the disparity between the left rectangular image 235 and the right rectangular image 237, the more distant on the front side of the operation surface 13, namely in the positive direction on the Z axis, the object is, the larger the disparity becomes. The reason that the disparity on the operation surface 13 between the left rectangular image 235 and the right rectangular image 237 is adjusted to 0 will be described later.

Figure 9:
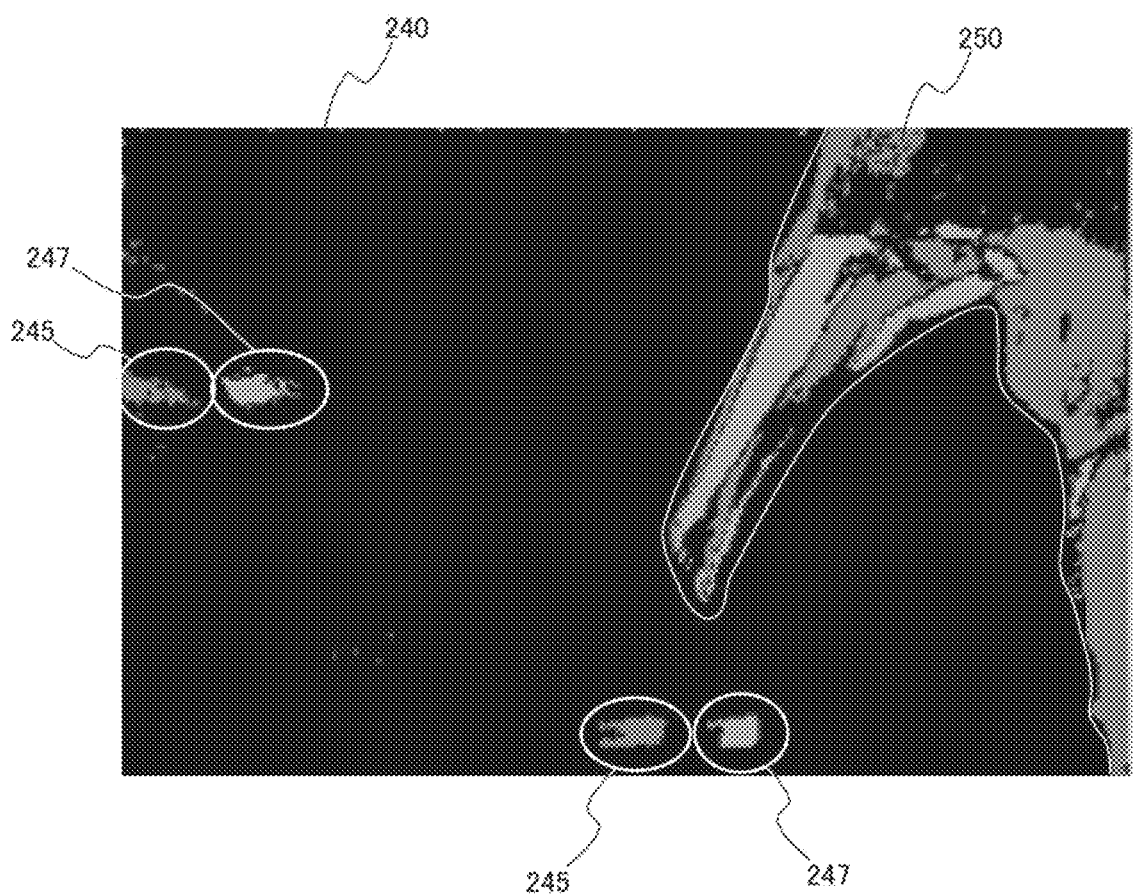
FIG. 9 is a diagram showing a difference image.

The process which corresponds to the formation step, and is executed by the tip detection section 165 is a process of forming a difference image 240 shown in FIG. 9 based on the left rectangular image 235 and the right rectangular image 237. Although the tip detection section 165 in the present embodiment forms the difference image 240 by subtracting the right rectangular image 237 from the left rectangular image 235, it is also possible to form the difference image 240 by subtracting the left rectangular image 235 from the right rectangular image 237. Subtraction is a process of, for example, subtracting a pixel value of a pixel of one image from a pixel value of a corresponding pixel of the other image.

The process which corresponds to the extraction step, and is executed by the tip detection section 165 is a process of extracting an area in which an amount of the disparity between the left taken image and the right taken image is within a range set in advance as a change area 250 shown in FIG. 9. As described above, the left rectangular image 235 and the right rectangular image 237 are images adjusted so that the disparity with respect to the operation surface 13 vanishes, and the difference image 240 is formed by subtracting the right rectangular image 237 from the left rectangular image 235. Therefore, a contact point and the neighborhood of an object having contact with the operation surface 13 where the disparity vanishes are not detected in the difference image 240. In the difference image 240, the image at the contact point and the neighborhood of the contact point becomes indistinguishable from an image of the operation surface 13 as a background. For example, when the tip of the pointing element 80 has contact with the operation surface 13, the tip of the pointing element 80 is not detected in the difference image 240. Further, in the difference image 240, there is detected an image of the pointing element 80 or the like the disparity of which between the left rectangular image 235 and the right rectangular image 237 is not 0, and which is located in the vicinity of the operation surface 13.

Figure 16:
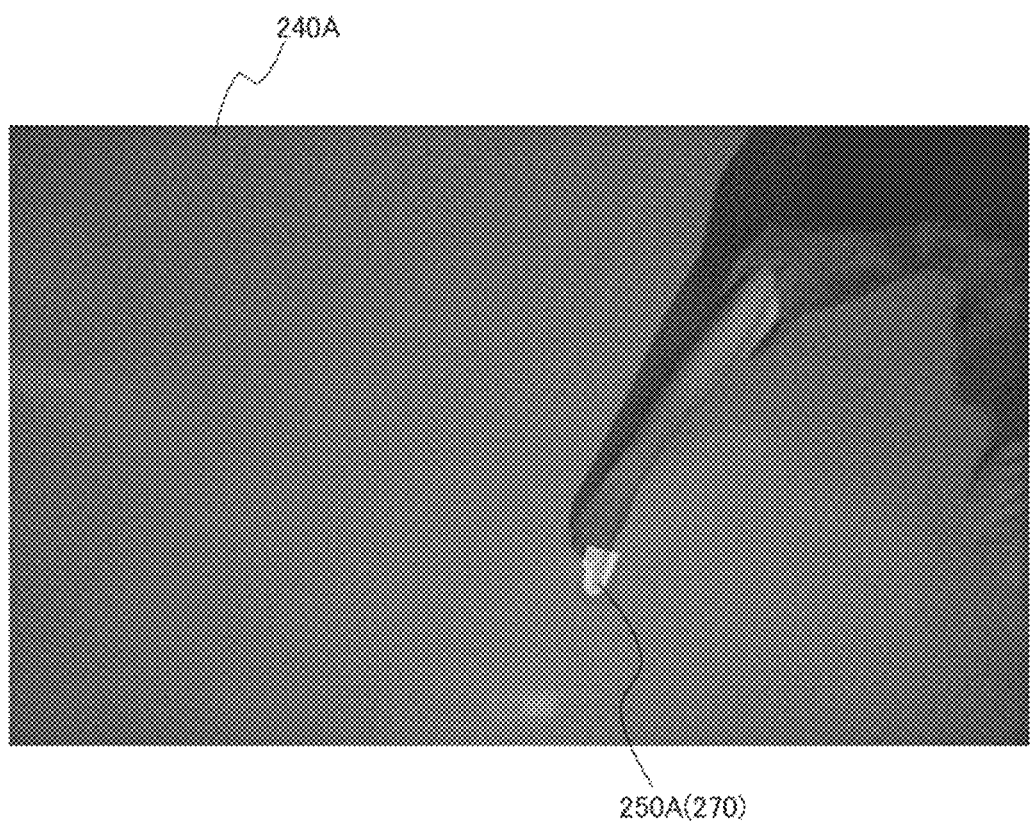
FIG. 16 is a diagram showing a first change area.

Further, as a process corresponding to the extraction step, the tip detection section 165 extracts the fingertip area 270 shown in FIG. 16 from the change area 250, wherein the fingertip area is an area where the fingertip is imaged. Here, the tip detection section 165 removes an image of an arm and so on from the change area 250 to thereby extract the fingertip area 270 as an area corresponding to the fingertip.

The process which corresponds to the detection step, and is executed by the tip detection section 165 is a process of detecting a tip position of the finger as the pointing element 80 based on the shape of the pointing element 80. The details of the formation step, the extraction step, and the detection step will be described later with reference to FIG. 9 through FIG. 22.

The determination section 167 executes a process including an output step in the present disclosure. The determination section 167 determines whether or not the pointing element 80 has had contact with the operation surface 13 based on the fingertip area 270 detected by the tip detection section 165. The determination section 167 is provided with a learned neural network, and determines the position of the fingertip and whether or not the fingertip has contact with the operation surface 13 based on the neural network. The process executed by the determination section 167 includes processes corresponding to the step S8 and the step S9 shown in FIG. 5.

The control section 170 is a computer device provided with a second storage section 175 and a processor 180. The second storage section 175 is provided with a volatile storage device such as a RAM (Random Access Memory), and a nonvolatile storage device such as a ROM (Read Only Memory) or a flash memory. The second storage section 175 stores a control program to be executed by the processor 180. In the control program, there is included, for example, firmware.

The processor 180 is an arithmetic processing device formed of a CPU (Central Processing Unit) or an MPU (Micro Processing Unit). The processor 180 executes the control program to control each section of the projector 100. The processor 180 can be formed of a single processor, or can also be formed of a plurality of processors. Further, the processor 180 can also be formed of an SoC integrated with a part or the whole of the second storage section 175 and other circuits. Further, the processor 180 can also be formed of a combination of the CPU for executing a program and a DSP for executing predetermined arithmetic processing. Further, it is also possible to adopt a configuration in which all of the functions of the processor 180 are implemented in the hardware, or it is also possible to configure all of the functions of the processor 75 using a programmable device.

The control section 170 is provided with an imaging control section 181 and an operation execution section 183 as functional blocks. These functional blocks represent the functions realized by the processor 180 executing the command set described in the control program to perform arithmetic operations and control with the blocks for descriptive purposes.

The imaging control section 181 makes the detection light irradiation section 130 perform the irradiation with the detection light, and makes the imaging section 120 perform imaging. The imaging section 120 images a range including the projection surface 10 at a predetermined frame rate to form a taken image. The taken image formed by the imaging section 120 is input to the position detection section 150. The imaging control section 181 corresponds to an irradiation control section in the present disclosure. The process executed by the irradiation control section corresponds to the step S4 shown in FIG. 5.

Information representing the pointing position of the pointing element 80 on the operation surface 13 and whether or not the pointing element 80 has had contact with the operation surface 13 is input to the operation execution section 183 from the position detection section 150. The operation execution section 183 detects the operation based on the information input from the position detection section 150, and then executes the process corresponding to the operation thus detected. For example, when an operation of moving the pointing element 80 having contact with the operation surface 13 on the operation surface 13 has been detected, the operation execution section 183 draws an image corresponding to the trajectory of the pointing element 80 thus moving in the projection area 15. The process to be executed by the operation execution section 183 corresponds to the step S10 shown in FIG. 5.

A-3. Overall Processing Flow

Figure 5:
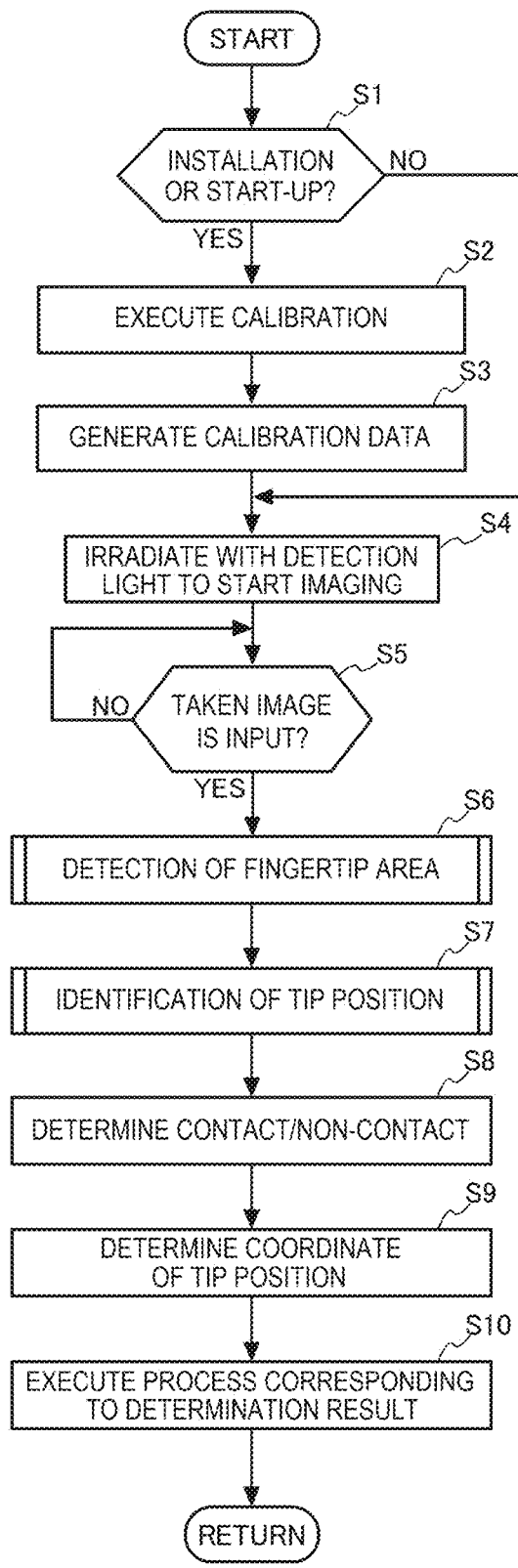
FIG. 5 is a flowchart showing an overall flow.

FIG. 5 is a flowchart showing the operation of the projector 100.

The operation of the projector 100 will be described with reference to FIG. 5.

Firstly, the control section 170 determines (step S1) whether or not the projector 100 is in an installation process or in a start-up process. For example, it is possible for the control section 170 to determine that the projector 100 is in the installation state when the operation receiving section 135 has received a signal corresponding to a predetermined button provided to the remote controller. Further, it is also possible for the control section 170 to determine that the projector 100 is in the installation process when the projector 100 is powered ON for the first time after the factory shipment of the projector 100. When the projector 100 is not in the installation state nor in the start-up state (NO in the step S1), the control section 170 makes the transition to the process in the step S4.

Further, when the projector 100 is in the installation state or the start-up state (YES in the step S1), the control section 170 makes the position detection section 150 execute (step S2) the calibration. The control section 170 makes the projection section 110 project the calibration image 201, and makes the imaging section 120 perform imaging. The position detection section 150 generates (step S3) the calibration data based on the left taken image and the right taken image taken by the imaging section 120. The calibration data thus generated is stored in the first storage section 151.

When the generation of the calibration data is completed and the operation is received by the operation receiving section 135, the control section 170 makes the detection light irradiation section 130 start the irradiation with the detection light, and makes the imaging section 120 start imaging (step S4). The step S4 corresponds to an irradiation step in the present disclosure.

The position detection section 150 determines (step S5) whether or not the left taken image has been input from the first camera 121 and the right taken image has been input from the second camera 123. When the taken image is not input (NO in the step S5), the position detection section 150 stands ready to start the process until the left taken image and the right taken image are input.

When the left taken image and the right taken image are input (YES in the step S5), the position detection section 150 processes the left taken image and the right taken image to form the difference image 240. Further, the position detection section 150 extracts the change area 250 corresponding to the pointing element 80 from the difference image 240 thus formed to detect (step S6) the fingertip area 270. Then, the position detection section 150 identifies (step S7) the tip position 255 of the finger as the pointing element 80 from the fingertip area 270 thus detected.

When the position detection section 150 has identified the tip position 255 of the pointing element 80, the position detection section 150 determines (step S8) whether or not the pointing element 80 and the operation surface 13 have contact with each other based on the tip position 255 thus identified. Further, the position detection section 150 determines (step S13) the coordinate in the operation surface 13 of the tip position 255. The position detection section 150 outputs the determination result on whether or not the pointing element 80 and the operation surface 13 have contact with each other and the coordinate in the operation surface 13 of the tip position 255 to the control section 170.

The control section 170 executes (step S10) the process based on the determination result on whether or not the pointing element 80 and the operation surface 13 have contact with each other and the coordinate in the operation surface 13.

For example, when the information representing the contact is continuously input from the position detection section 150, the control section 170 generates the trajectory data representing the trajectory of the motion of the pointing element 80 based on the coordinate in the operation surface 13, and then projects an image of a figure or the like corresponding to the trajectory data thus generated on the projection area 15 to thereby display the image. Further, when the information representing the contact is input, the control section 170 determines whether or not an icon is displayed at the coordinate in the operation surface 13 thus input. When the icon is displayed at the coordinate in the operation surface 13 thus input, the control section 170 associates the operation associated with this icon with the operation of the pointing element 80. For example, when the icon denotes a pen, the control section 170 generates the trajectory data representing the trajectory of the position where the tip of the pointing element 80 has contact with the operation surface 13, and projects an image of a figure or the like corresponding to the trajectory data thus generated on the projection area 15 to thereby display the image. Further, when the icon denotes an eraser, display of the image of a figure or the like displayed at the position in the operation surface 13 corresponding to the coordinate in the operation surface 13 thus input is erased.

A-4. Stereo Calibration

Then, the calibration will be described with reference to FIG. 6 and FIG. 7.

Figure 6:
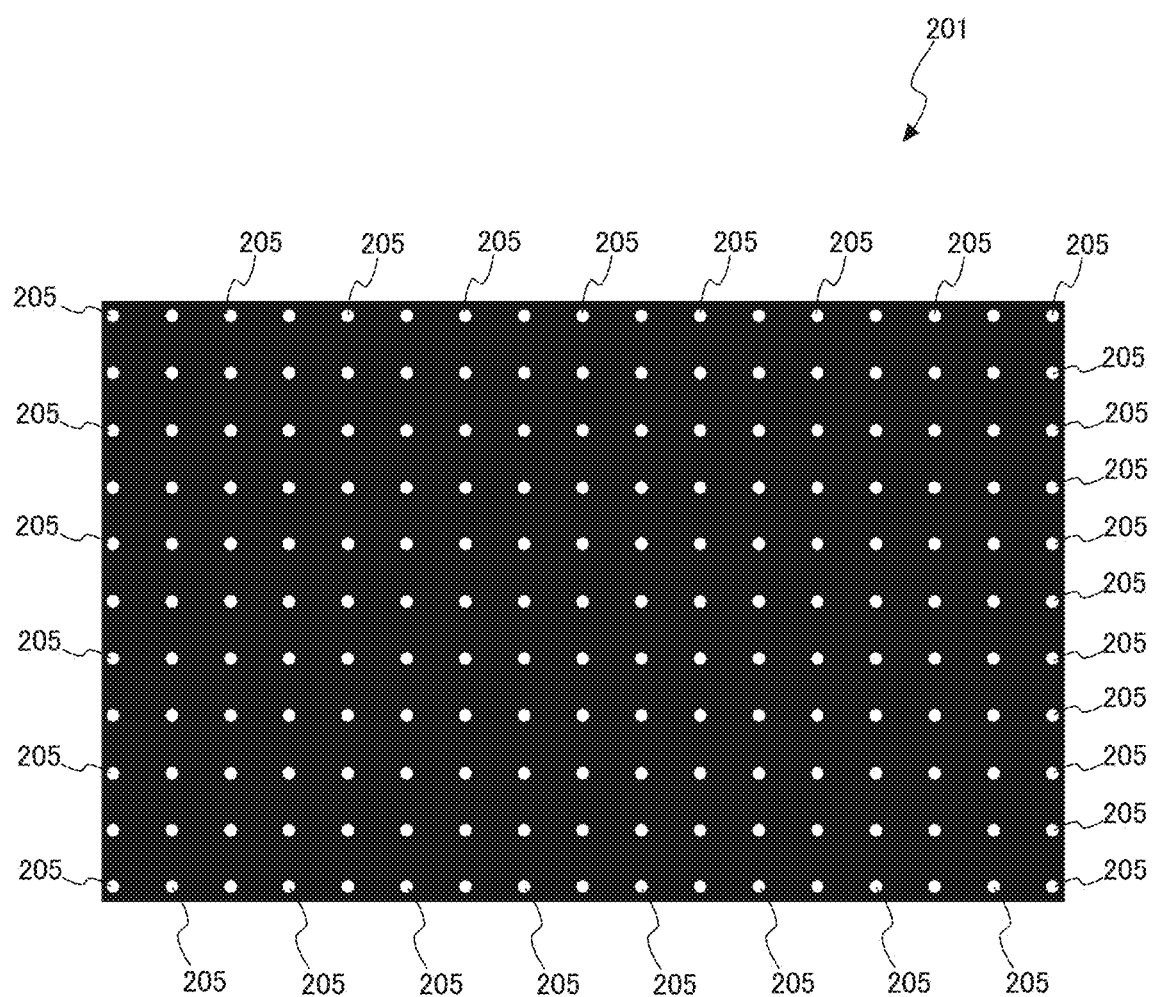
FIG. 6 is a diagram showing an example of a calibration image.

FIG. 6 is a diagram showing an example of the calibration image 201.

Figure 7:
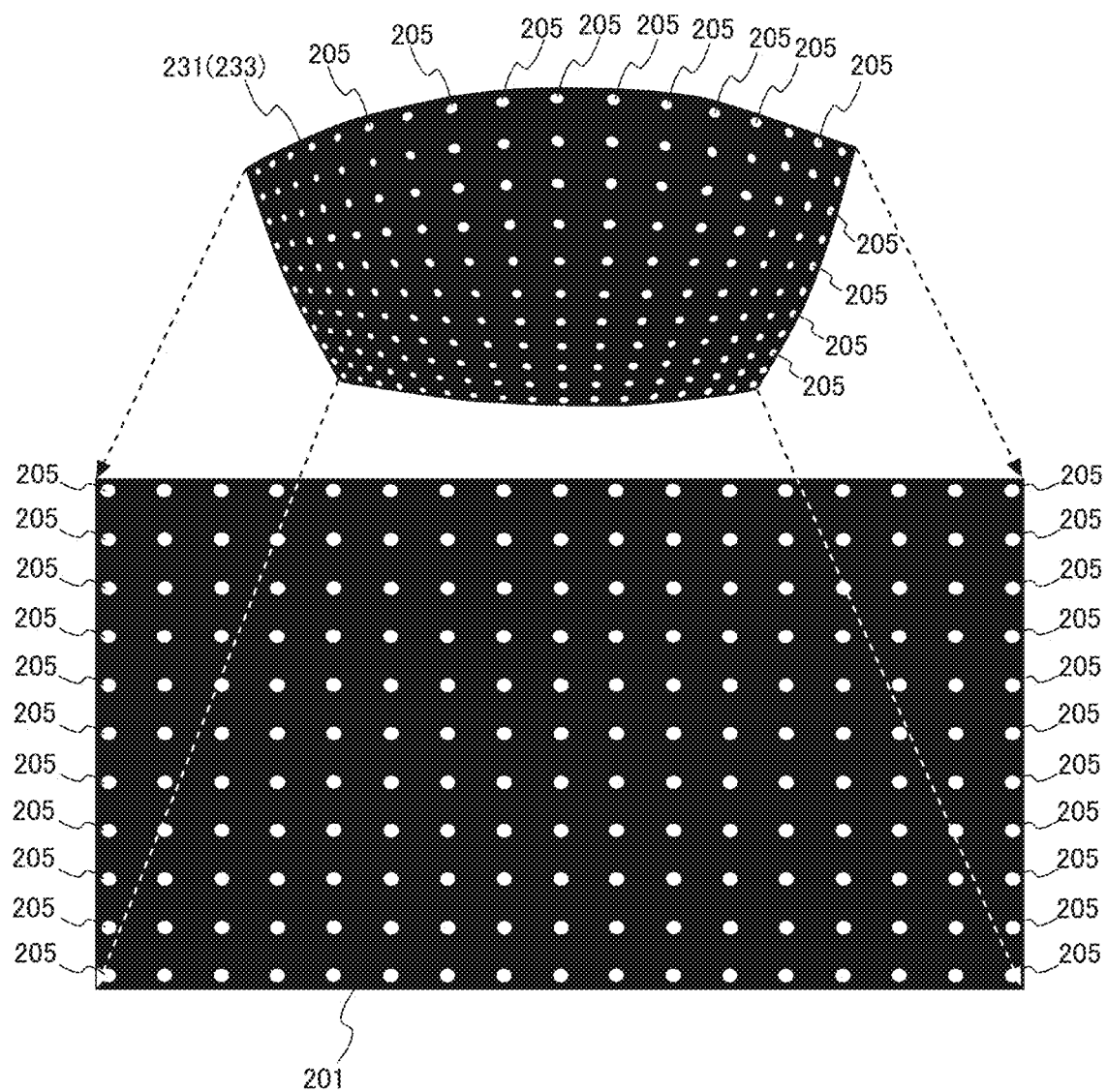
FIG. 7 is an explanatory diagram for explaining a conversion method of converting a left extracted image and a right extracted image into a rectangular shape.

Firstly, due to the control by the control section 170, the projection section 110 is made to project the calibration image 201 shown in FIG. 7, and the first camera 121 and the second camera 123 are made to image the projection surface 10 on which the calibration image 201 is projected.

As shown in FIG. 6, the calibration image 201 is an image in which the marks 205 each having a predetermined shape are arranged in the vertical direction and the horizontal direction of the calibration image 201 at regular intervals. In the present embodiment, as the calibration image 201, there is used an image in which white dots as the marks 205 are arranged in the vertical direction and the horizontal direction of the calibration image 201 at regular intervals on a black background.

The calibration data generation section 161 obtains the left taken image obtained by imaging the projection surface 10 on which the calibration image 201 is projected with the first camera 121, and the right taken image obtained by imaging the projection surface 10 with the second camera 123.

The calibration data generation section 161 refers to the first range information to extract the area of the left taken image corresponding to the projection area 15. Similarly, the calibration data generation section 161 refers to the second range information to extract the area of the right taken image corresponding to the projection area 15. The area of the left taken image corresponding to the projection area 15 thus extracted is referred to as a left extracted image 231, and the area of the right taken image corresponding to the projection area 15 thus extracted is referred to as a right extracted image 233.

FIG. 7 is a diagram showing a deformation method of deforming the shapes of the left extracted image 231 and the right extracted image 233 into rectangular shapes.

In an upper part of FIG. 7, there are shown the left extracted image 231 and the right extracted image 233. Due to the relationship between the first camera 121 and the projection surface 10 and the relationship between the second camera 123 and the projection surface 10, the left taken image and the right taken image each become a rectangular image. Further, the left extracted image 231 and the right extracted image 233 each become an image in which the marks 205 are shifted in the relationship with the first camera 121 and the second camera 123.

The calibration data generation section 161 compares the calibration image 201 stored in the first storage section 151 with the left extracted image 231 and the right extracted image 233 to decide the first image conversion coefficient and the second image conversion coefficient. Specifically, since the left extracted image 231 and the right extracted image 233 are the same in the deformation method as each other, the deformation method for the left extracted image 231 will hereinafter be described.

The calibration data generation section 161 compares the positions of the marks 205 in the calibration image 201 with the positions of the marks in the left extracted image 231, and compares the vertexes of the calibration image 201 with the vertexes of the left extracted image 231. The calibration data generation section 161 decides a stretching direction and a stretching amount as deformation amounts for deforming the left extracted image 231 into the same rectangular shape as that of the calibration image 201 as the first image conversion coefficient based on these comparison results. Similarly, the calibration data generation section 161 compares the positions of the marks 205 in the calibration image 201 with the positions of the marks in the right extracted image 233, and compares the vertexes of the calibration image 201 with the vertexes of the right extracted image 233. The calibration data generation section 161 decides a stretching direction and a stretching amount as deformation amounts for deforming the right extracted image 233 into the same rectangular shape as that of the calibration image 201 as the second image conversion coefficient based on these comparison results.

The first image conversion coefficient is a coefficient for converting the shape of the left extracted image 231 so that the positions of the marks 205 of the left extracted image 231 coincide with the positions of the marks 205 formed in the calibration image 201. Further, the second image conversion coefficient is a coefficient for converting the shape of the right extracted image 233 so that the positions of the marks 205 of the right extracted image 233 coincide with the positions of the marks 205 formed in the calibration image 201. Therefore, the left extracted image 231 converted using the first image conversion coefficient and the right extracted image 233 converted using the second image conversion coefficient coincide with the calibration image 201. Therefore, the left extracted image 231 and the right extracted image 233 are converted so that the disparity on the projection surface 10 becomes 0. The left extracted image 231 and the right extracted image 233 converted so that the disparity on the projection surface 10 becomes 0 correspond to the first taken image and the second taken image calibrated with respect to the operation surface in the present disclosure. Further, the calibration can be said to be a stereo calibration for making the coordinate system of the first camera 121 and the coordinate system of the second camera 123 correspond to the coordinate system of the projection surface 10.

A-5. Detection of Fingertip Area

Figure 8:
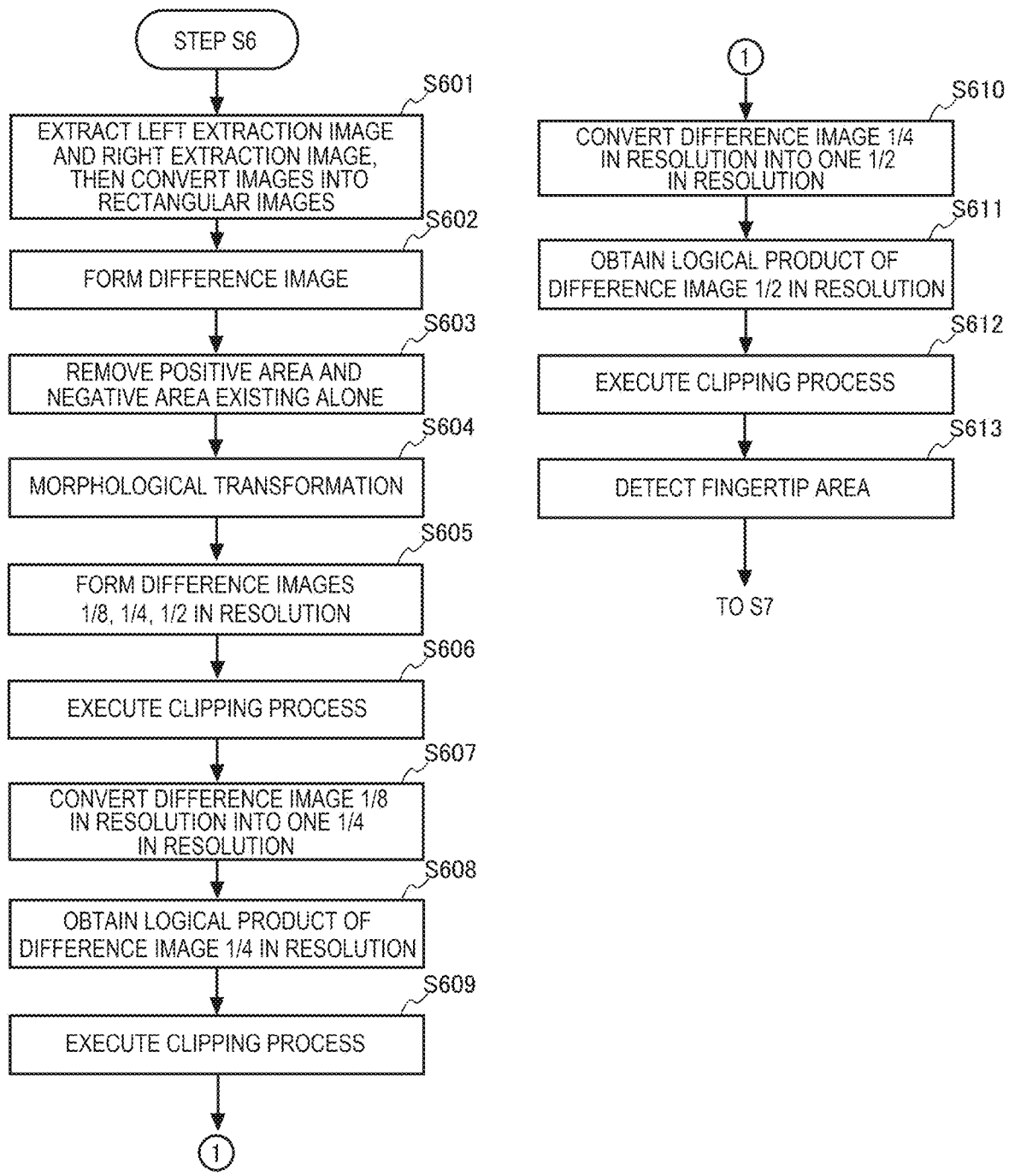
FIG. 8 is a flowchart showing a process of detecting a fingertip area.

FIG. 8 is a flowchart showing a detection process for the fingertip area in the step S6 shown in FIG. 5.

Detection of the fingertip area is a process of detecting the fingertip area 270 shown in FIG. 16 as an area including the tip of the pointing element 80 having contact with or having approached the operation surface 13 from the whole of the taken image of the operation surface 13.

The details of the detection process for the fingertip area 270 will be described with reference to the flowchart shown in FIG. 8. Firstly, when the position detection section 150 obtains the left taken image of the first camera 121, the position detection section 150 extracts the left extracted image 231 from the left taken image using the calibration data, and then deforms the shape of the left extracted image 231 thus extracted into a rectangular shape to form (step S601) the left rectangular image 235. Similarly, when the position detection section 150 obtains the right taken image of the second camera 123, the position detection section 150 extracts the right extracted image 233 from the right taken image using the calibration data, and then deforms the shape of the right extracted image 233 into a rectangular shape to form (step S601) the right rectangular image 237.

Then, the position detection section 150 forms (step S602) the difference image 240. The position detection section 150 forms the difference image 240 by subtracting the right rectangular image 237 from the left rectangular image 235.

FIG. 9 is a diagram showing the difference image 240.

The difference image 240 includes the change area 250. The change area 250 is an area in which an amount of the disparity between the left rectangular image 235 and the right rectangular image 237 is within a predetermined range. The difference image 240 is an image obtained by subtracting the right rectangular image 237 from the left rectangular image 235. Therefore, the object which is located at the position where Z=0 is true as the position of the projection surface 10, and the disparity of which becomes 0 is not displayed in the difference image 240. Further, the more distant from the projection surface 10 the position where the object exists is, the larger the disparity becomes, and the larger the difference between the position of the object in the left rectangular image 235 and the position of the object in the right rectangular image 237 becomes. In FIG. 9, the change area 250 corresponds to an area where the finger as the pointing element 80, the hand, the arm, and so on are imaged. Further, in the difference image 240 shown in FIG. 9, there is detected an isolated area of the positive area 245 and the negative area 247 as a noise of the reflected light or a noise caused by reflection of the outside light on the projection surface 10 due to the condition of the projection surface 10 and so on.

Figure 10:
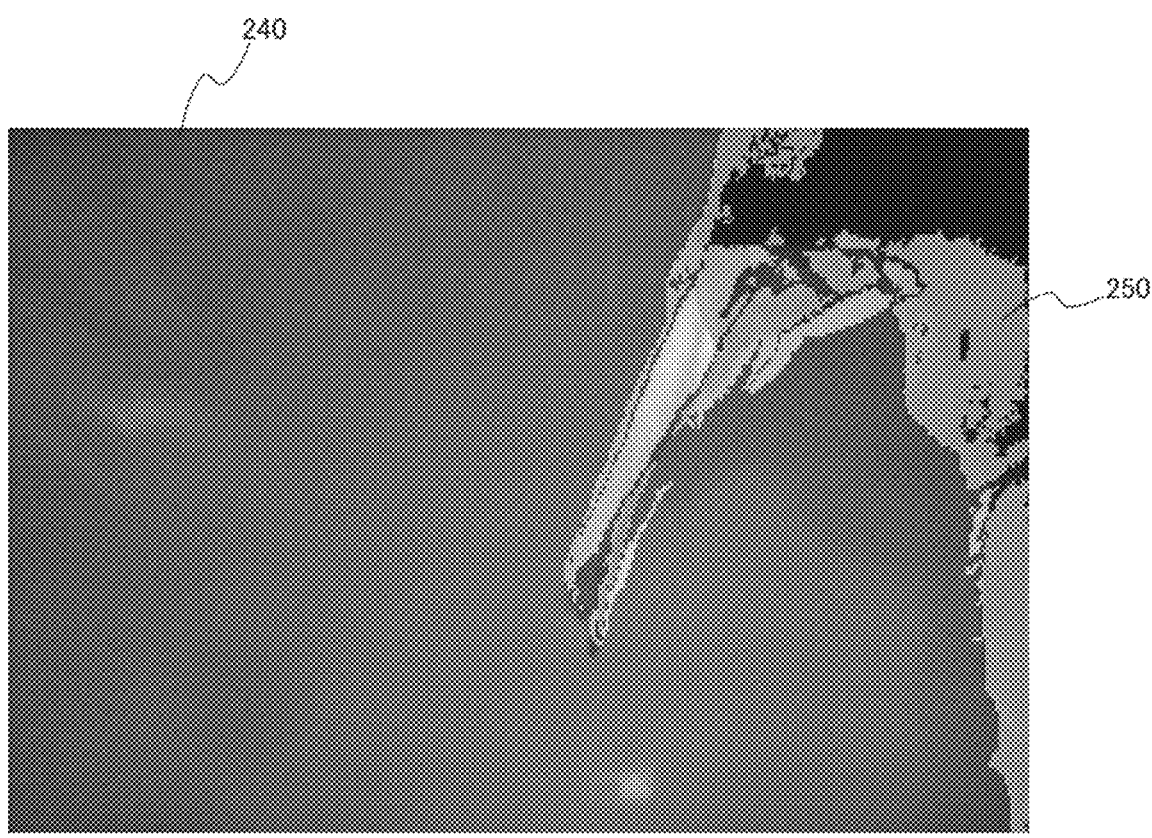
FIG. 10 is a diagram showing a state in which a positive area and a negative area are removed.

FIG. 10 is a diagram showing a state in which the positive areas 245 and the negative areas 247 included in the difference image 240 are removed.

The position detection section 150 removes (step S603) the isolated areas of the positive areas 245 and the positive areas 247 included in the difference image 240 thus formed. The position detection section 150 removes an area of the image where only the positive area 245 exists alone and an area of the image where only the negative area 247 exists alone in the difference image 240. The difference image 240 is an image formed by subtracting the right rectangular image 237 from the left rectangular image 235. For example, when the pixel value of the left rectangular image 235 is larger than the pixel value of the right rectangular image 237, the positive area 245 occurs in the difference image 240. Further, when the pixel value of the right rectangular image 237 is larger than the pixel value of the left rectangular image 235 in the corresponding image, the negative area 247 occurs in the difference image 240.

By removing the positive area 245 and the negative area 247 existing alone, only the area where the positive area 245 and the negative area 247 exist adjacent to each other with a distance no larger than a predetermined distance remains in the difference image 240. The area where the positive area 245 and the negative are 247 exist adjacent to each other becomes the change area 250. The change area 250 corresponds to an area where an amount of the disparity between the left rectangular image 235 and the right rectangular image 237 is within a predetermined range, and an area where the object existing near to the projection surface 10 is imaged.

Figure 11:
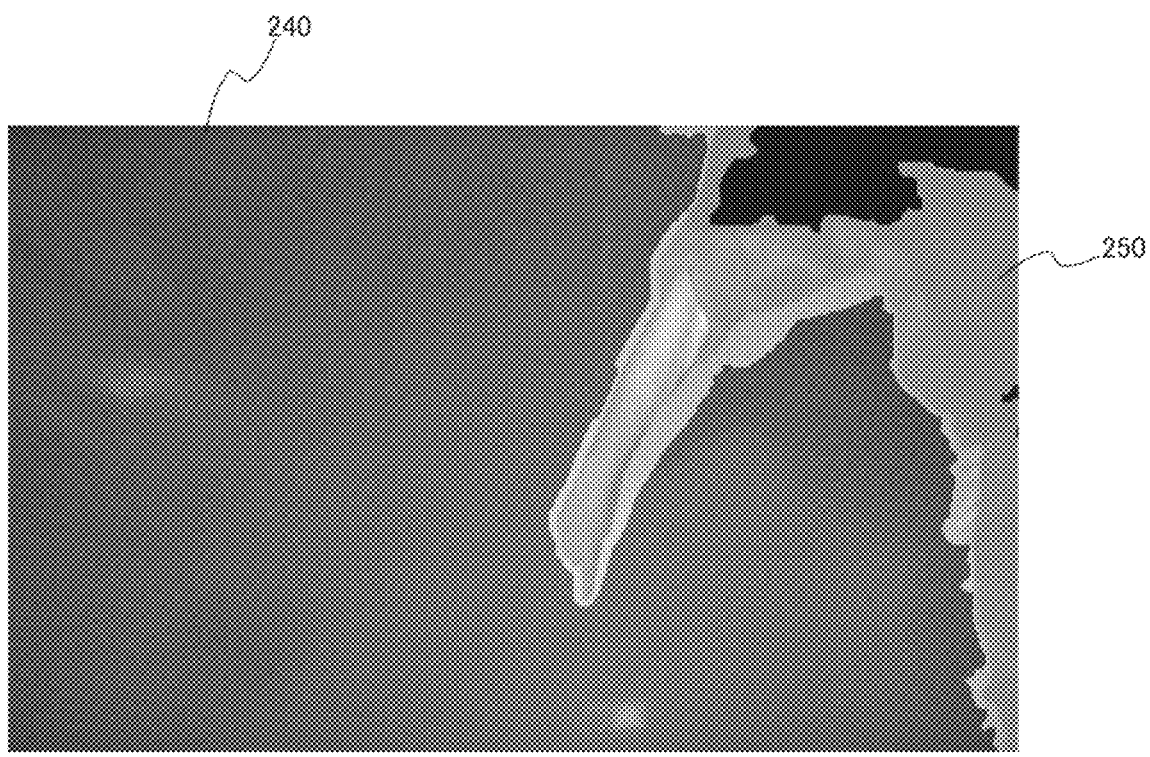
FIG. 11 is a diagram showing a difference image on which morphological transformation has been performed.

FIG. 11 is a diagram showing the difference image 240 on which morphological transformation has been performed.

The position detection section 150 performs (step S604) the morphological transformation for expansion and contraction on the change area 250 of the difference image 240 to remove the isolated point to perform plugging of a bored area. FIG. 11 shows the difference image 240 in which the isolated points have been removed in the morphological transformation, and the bored areas have been plugged. The change area 250 formed by performing the process such as the morphological transformation and the plugging on the difference image 240 corresponds to a candidate area in the present disclosure. The candidate area is an area including the tip of the pointing element 80 having contact with or having approached the operation surface 13 in the change area 250.

Then, the position detection section 150 converts the resolution of the difference image 240 on which the morphological transformation has been performed to form (step S605) a difference image 240 ½ in resolution, a difference image ¼ in resolution, and a difference image 240 ⅛ in resolution, respectively. The difference image 240 ½ in resolution is defined as a first difference image 240A, and the change area 250 detected in the first difference image 240A is defined as a first change area 250A. Further, the difference image 240 ¼ in resolution is defined as a second difference image 240B, and the change area 250 detected in the second difference image 240B is defined as a second change area 250B. Further, the difference image 240 ⅛ in resolution is defined as a third difference image 240C, and the change area 250 detected in the third difference image 240C is defined as a third change area 250C.

Figure 12:
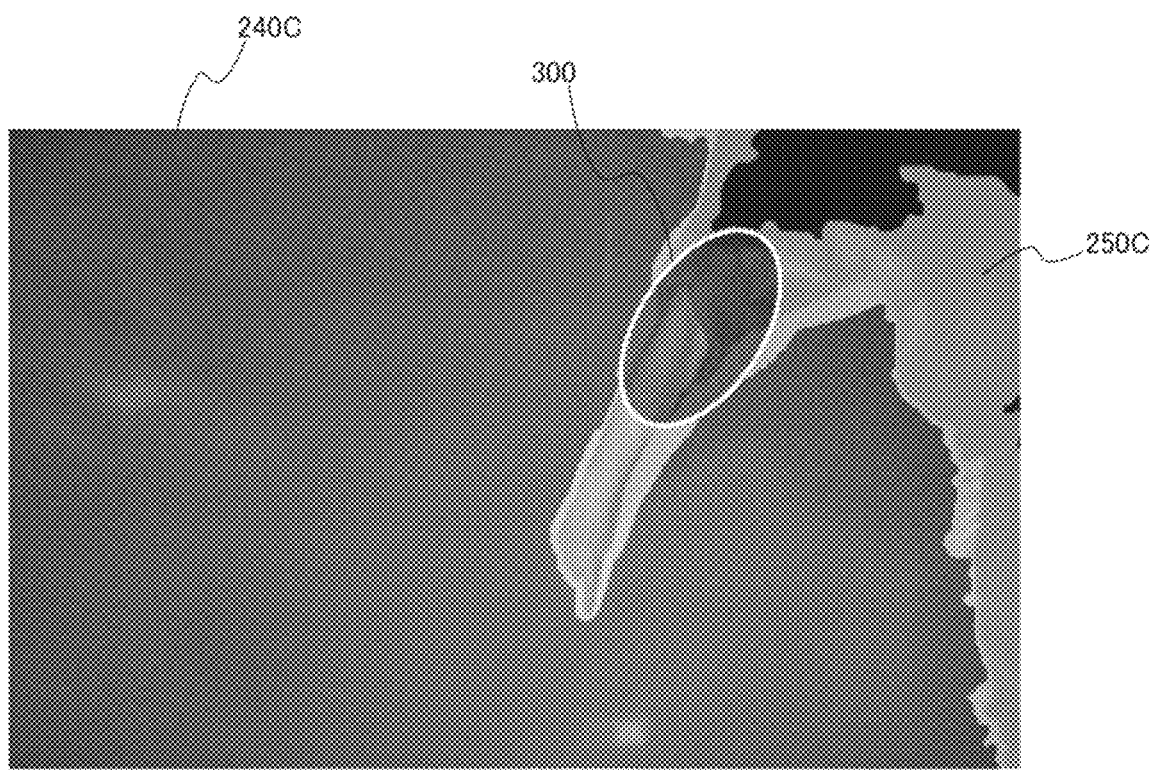
FIG. 12 is a diagram showing a state in which a figure is superimposed on the change area.

FIG. 12 is a diagram showing the third difference image 240C obtained by converting the difference image 240 shown in FIG. 11 on which the morphological transformation has been performed into one ⅓ in resolution. Further, FIG. 12 is a diagram showing the state in which a figure 300 is superimposed on the third change area 250C.

Figure 13:
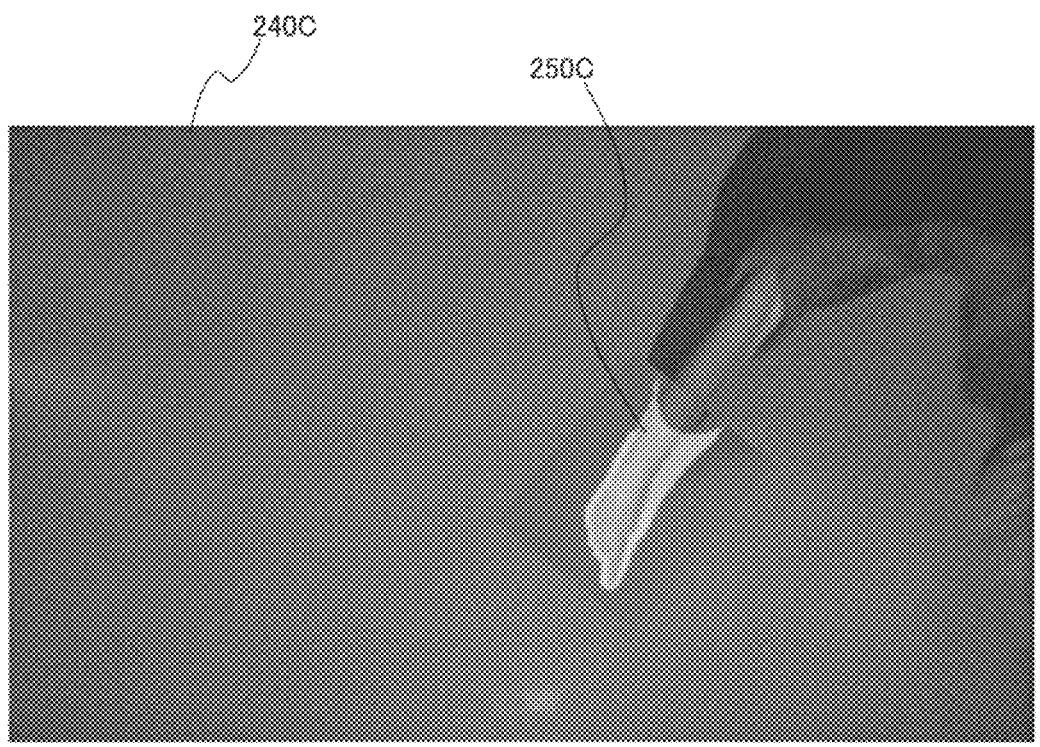
FIG. 13 is a diagram showing a state in which an image in the change area having contact with an outer periphery of the difference image is removed.

The position detection section 150 executes (step S606) a clipping process. The position detection section 150 detects the third change area 250C which the figure 300 having a predetermined size completely fits into while moving the figure 300 on the third difference image 240C ⅓ in resolution. When the tip detection section 165 has detected the third change area 250C which the figure 300 fits into, the tip detection section 165 deletes the image in the third change area 250C on which the figure 300 is super imposed. FIG. 12 shows the state in which the image in the third change area 250C superimposed on the figure 300 is deleted. The position detection section 150 repeats this process until the third change area 250C which the figure 300 fits into no longer exists. Then, the position detection section 150 removes an area having contact with an outer periphery of the third difference image 240C out of the third change area 250C. FIG. 13 is a diagram showing a state in which an image in the third change area 250C having contact with the outer periphery of the third difference image 240C is removed.

The position detection section 150 converts (step S607) the third difference image 240C ⅛ in resolution into one ¼ in resolution. Then, the position detection section 150 calculates (step S608) a logical product of the third difference image 240C having been converted into one ¼ in resolution and the second difference image 240B ¼ in resolution. Thus, there is formed the second difference image 240B which is the second difference image 240B ¼ in resolution, and from which the image removed in the third change area 250C ⅛ in resolution is removed.

Figure 14:
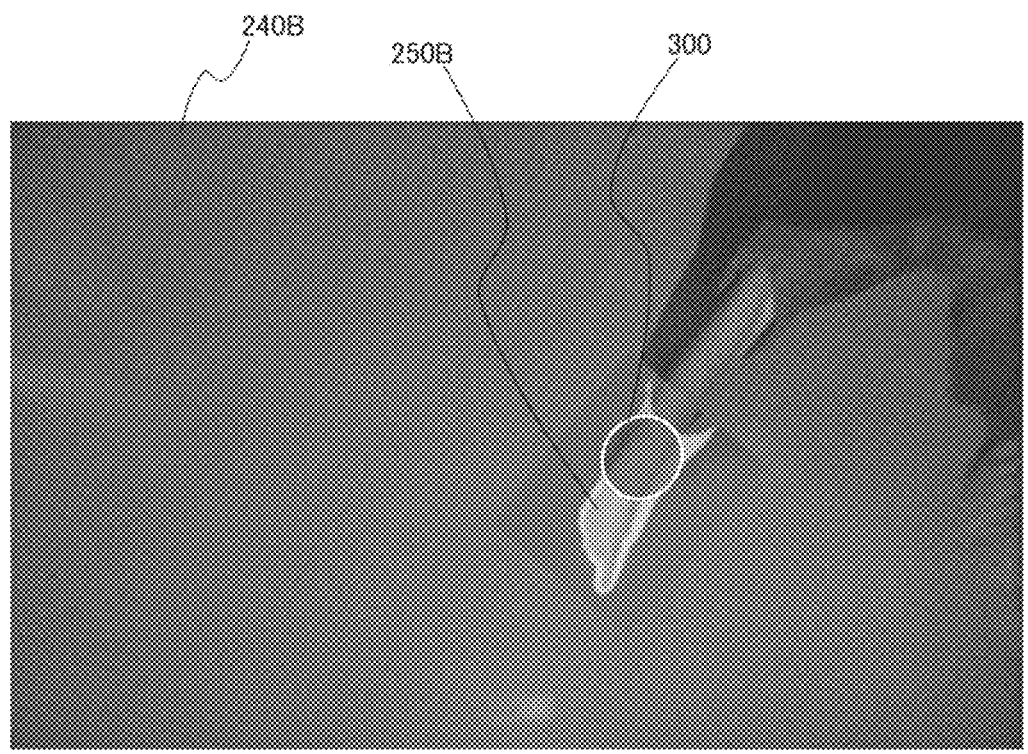
FIG. 14 is a diagram showing a state in which a figure is superimposed on the change area.

FIG. 14 is a diagram showing the second difference image 240B, and shows a state in which the figure 300 is superimposed on the second change area 250B.

Figure 15:
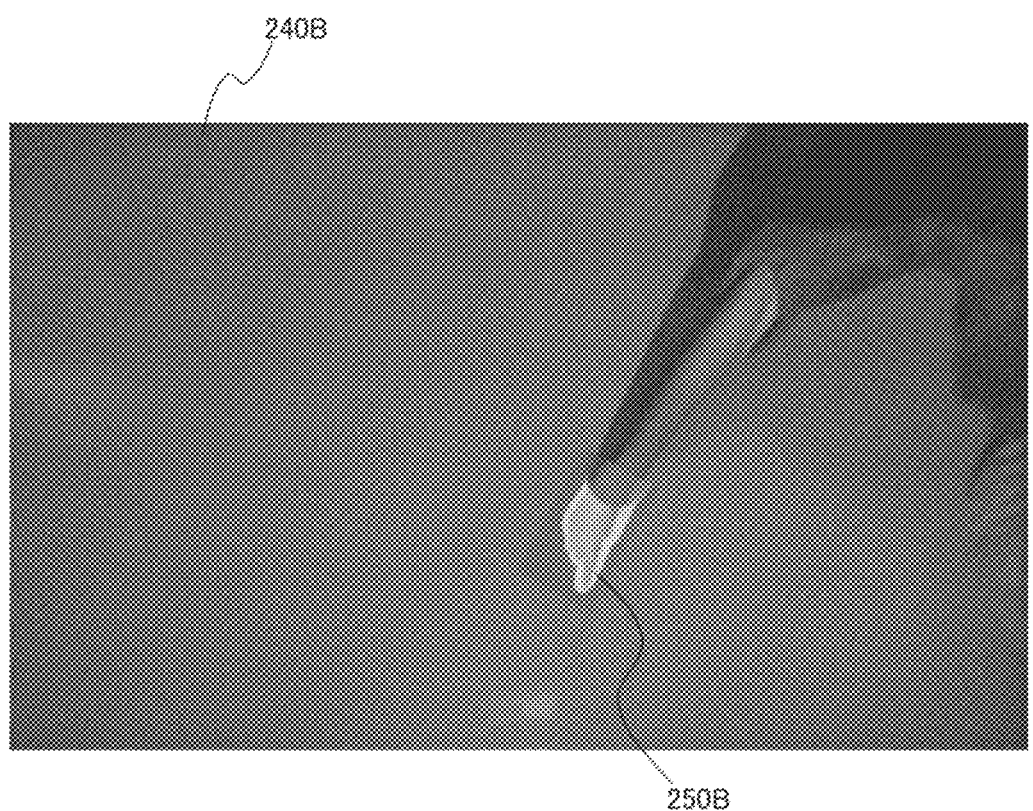
FIG. 15 is a diagram showing a state in which an image in the change area having contact with an outer periphery of the difference image is removed.

The position detection section 150 executes (step S609) the clipping process. The position detection section 150 detects the second change area 250B which the figure 300 completely fits into while moving the figure 300 on the second difference image 240B ¼ in resolution. The size of the figure 300 is the same as the size of the figure 300 used for the removal of the image in the third difference image 240C ⅛ in resolution, when the tip detection section 165 has detected the second change area 250B which the figure 300 fits into, the tip detection section 165 deletes the image in the second change area 250B on which the figure 300 is superimposed. The position detection section 150 repeats this process until the second change area 250B which the figure 300 fits into no longer exists. Then, the position detection section 150 removes an area having contact with an outer periphery of the second difference image 240B out of the second change area 250B. FIG. 15 shows a state in which an image in the second change area 250B having contact with the outer periphery of the second difference image 240B is removed.

Then, the position detection section 150 converts (step S610) the second difference image 240B ¼ in resolution into one ½ in resolution. Then, the position detection section 150 calculates (step S611) a logical product of the second difference image 240B having been converted into one ½ in resolution and the first difference image 240A ½ in resolution. Thus, there is formed the first difference image 240A which is the first difference image 240A ½ in resolution, and from which the image removed in the third change area 250C ⅛ in resolution and the image removed in the second change area 250B ¼ in resolution are removed.

FIG. 16 is a diagram showing the first difference image 240A.

Figure 17:
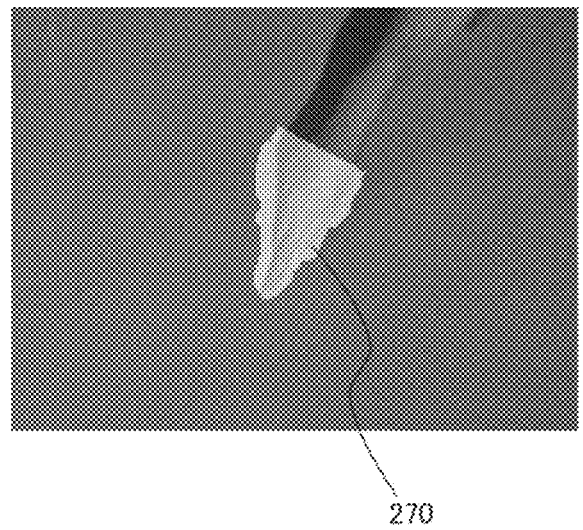
FIG. 17 is a diagram obtained by clipping a specific area centered on the fingertip area from the difference image.

The position detection section 150 executes (step S612) the clipping process. The position detection section 150 detects the first change area 250A which the figure 300 having a predetermined size completely fits into while moving the figure 300 on the first difference image 240A ½ in resolution. The size of the figure 300 is the same as the size of the figure 300 used for the removal of the image in the third difference image 240C ⅛ in resolution and the second difference image 240B ¼ in resolution, when the position detection section 150 has detected the first change area 250A which the figure 300 fits into, the position detection section 150 deletes the image in the first change area 250A on which the figure 300 is superimposed. The position detection section 150 repeats this process until the first change area 250A which the figure 300 fits into no longer exists. The position detection section 150 detects (step S613) the first change area 250A remaining unremoved as the fingertip area 270. FIG. 17 is a diagram obtained by clipping a specific area centered on the fingertip area 270 from the difference image 240. Thus, it is possible to detect the fingertip area 270 as an area including the tip of the pointing element 80 having contact with or having approached the operation surface 13 from the whole of the taken image of the operation surface 13 without false detection due to an influence of a noise or the like.

A-6. Identification of Tip Position

Figure 18:
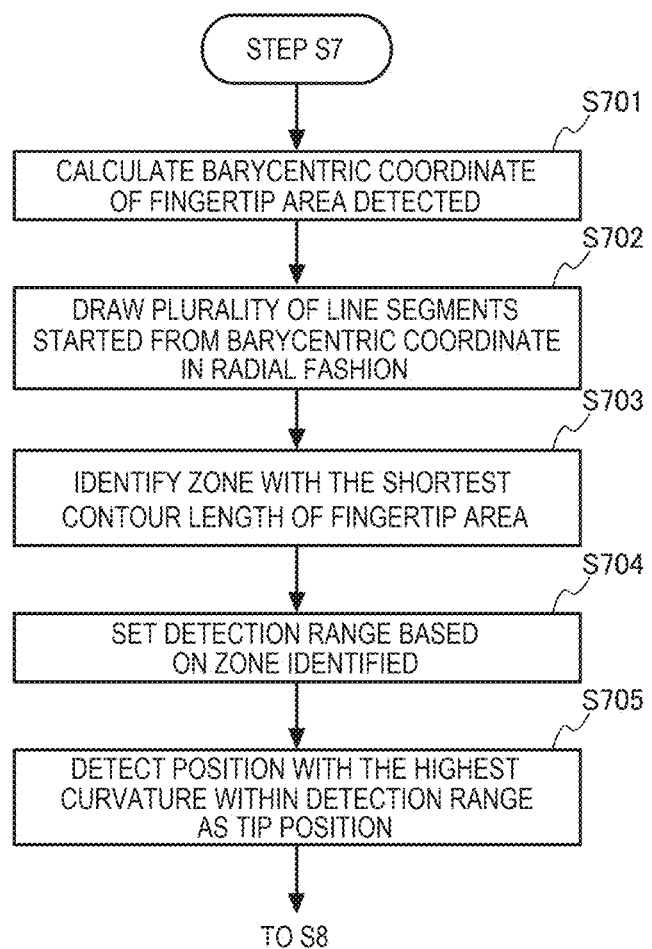
FIG. 18 is a flowchart showing details of a process of identifying a tip position of a finger.

FIG. 18 is a flowchart showing the details of a process of identifying the tip position of the finger in the step S7 shown in FIG. 6. The identification of the tip position of the finger is a process of calculating the tip position 255 of the fingertip area 270 shown in FIG. 21 based on the fingertip area 270 detected in the step S6, and then clipping an area corresponding to the tip position 255 from each of the left taken image and the right taken image.

Figure 19:
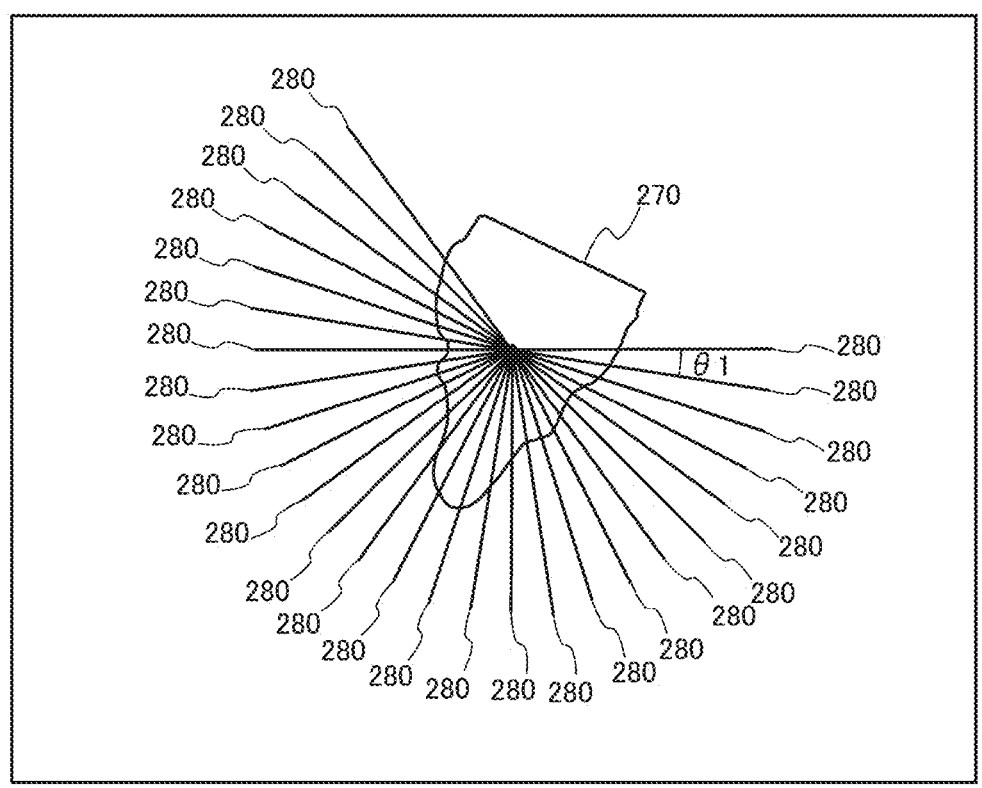
FIG. 19 is a diagram showing line segments drawn in a radial fashion.

The process of identifying the tip position of the finger will be described with reference to the flowchart shown in FIG. 18. FIG. 19 is a diagram obtained by showing the fingertip area 270 corresponding to FIG. 17, and drawing radial line segments 280.

Firstly, the position detection section 150 calculates (step S701) a barycentric coordinate of the fingertip area 270 detected. When the position detection section 150 has calculated the barycentric coordinate of the fingertip area 270, the position detection section 150 draws (step S702) a plurality of line segments 280 on the first difference image 240A setting the barycentric coordinate of the fingertip area 270 thus calculated as the starting point in a radial fashion centering around the barycentric coordinate. On this occasion, the position detection section 150 draws the plurality of line segments 280 so that the angle 61 formed between the line segments 280 adjacent to each other becomes constant as shown in FIG. 19.

Figure 20:
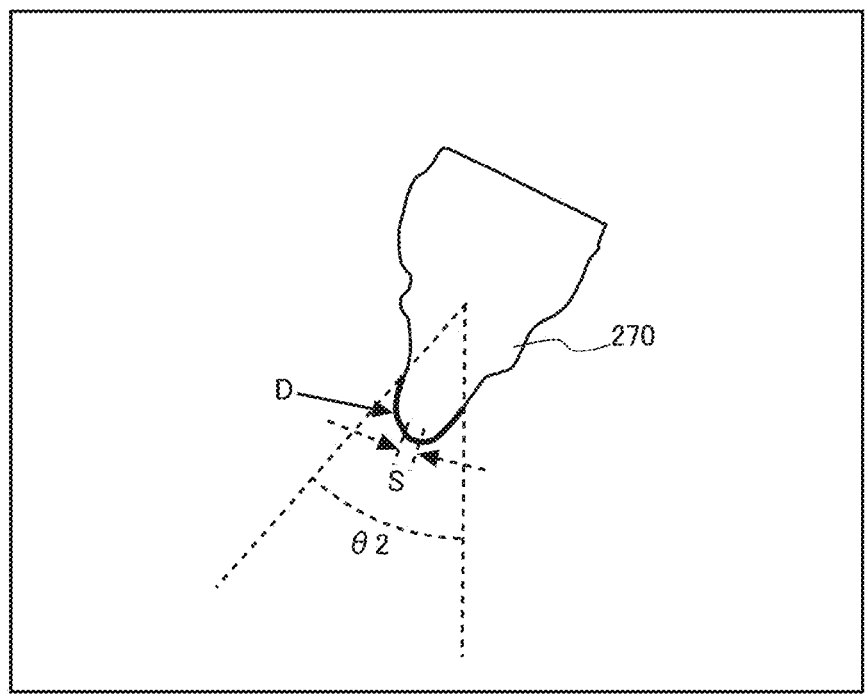
FIG. 20 is a diagram showing a zone in which the length of the contour line is the shortest and a detection range.

FIG. 20 is a diagram showing a zone S in which the length of the contour line is the shortest and a detection range D.

The position detection section 150 calculates the length of the contour line in each of the zones obtained by separating the fingertip area 270 with two line segments 280 adjacent to each other to identify (step S703) the zone in which the length of the contour line thus calculated is the shortest. It is assumed that the zone S shown in FIG. 20 is the zone in which the length of the contour line is the shortest.

Then, the position detection section 150 sets (step S704) the detection range D based on the zone S thus identified. For example, the range of the contour line corresponding to the angle 62 shown in FIG. 20 corresponds to the detection range D. The detection range D is a range including the zone S and including the both sides of the contour line separated by the zone S.

Figure 21:
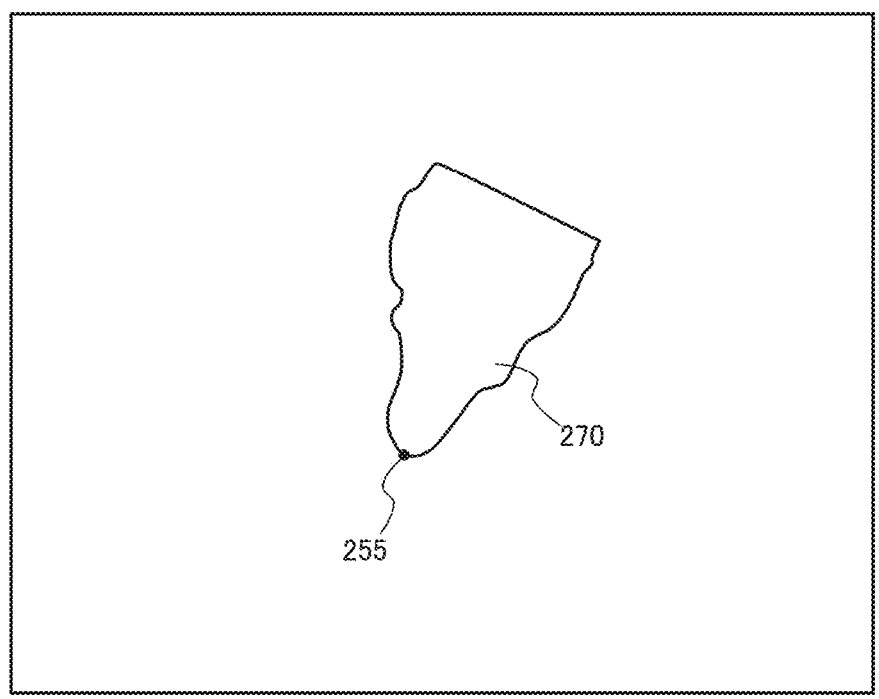
FIG. 21 is a diagram showing a tip position of the fingertip area.

Then, the position detection section 150 detects (step S705) the position where the curvature of the fingertip area 270 is the highest within the detection range D thus set. The position detection section 150 sets the position where the curvature is the highest thus detected as the tip position 255. FIG. 21 is a diagram showing the tip position 255 in the fingertip area 270. The position detection section 150 clips an image in a predetermined range centered on the tip position 255 from the left rectangular image 235 as the base of the difference image 240 corresponding to the detection of the tip position 255. Further, the position detection section 150 clips an image in a predetermined range centered on the tip position 255 from the right rectangular image 237 as the base of the difference image 240 corresponding to the detection of the tip position 255. The image clipped from the left rectangular image 235 is referred to as a left clipped image 241, and the image clipped from the right rectangular image 237 is referred to as a right clipped image 243. The predetermined range is set in accordance with the size and the shape of the pointing element 80.

Figure 22:
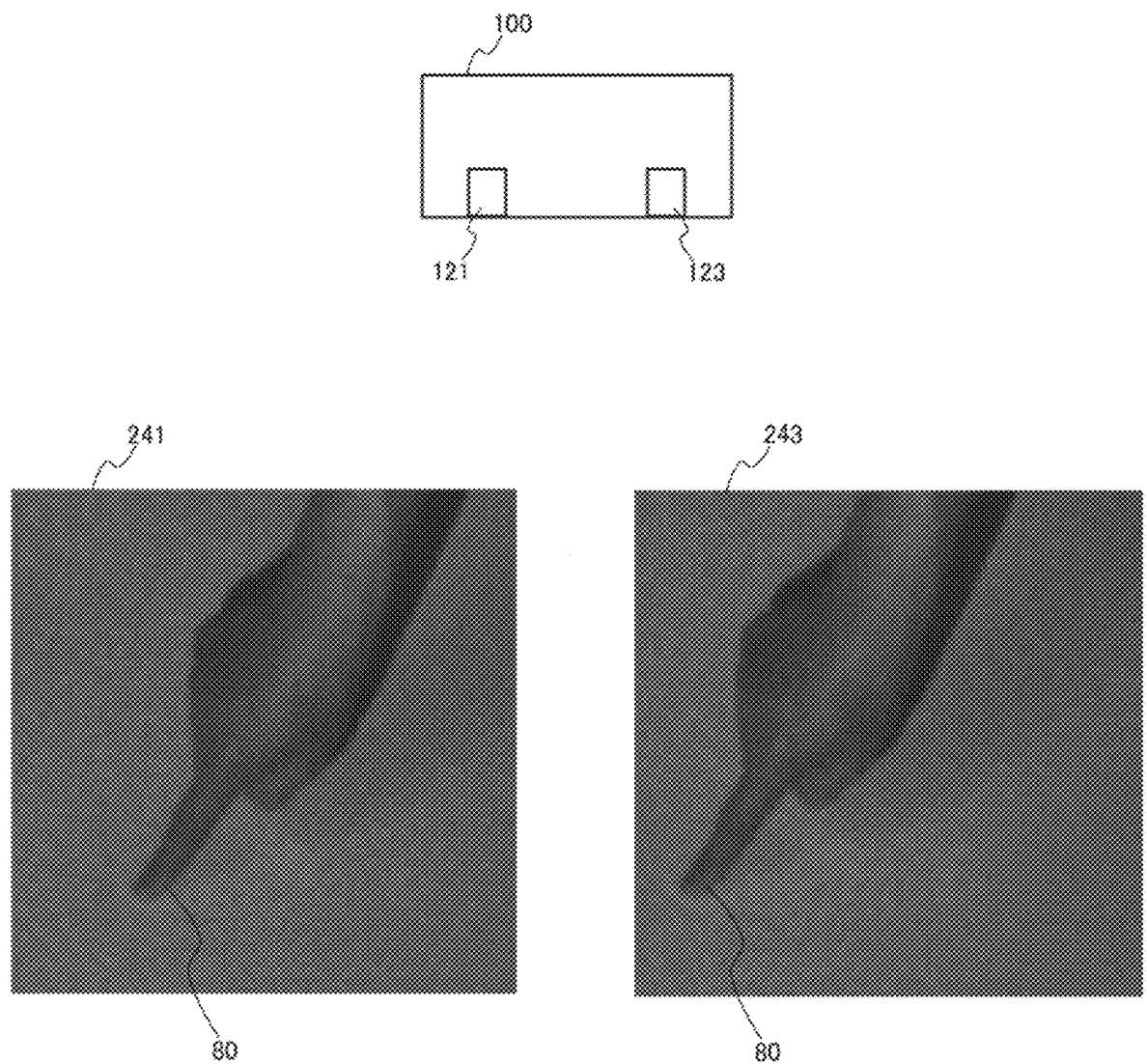
FIG. 22 is a diagram showing a left clipped image and a right clipped image.

FIG. 22 is a diagram showing the left clipped image 241 and the right clipped image 243. The left clipped image 241 corresponds to a first area image in the present disclosure, and the right clipped image 243 corresponds to a second area image in the present disclosure. Thus, the first area image and the second area image which are each an image in a predetermined range including the tip of the pointing element 80 having contact with or having approached the operation surface 13 can respectively be clipped from the left taken image and the right taken image obtained by imaging the whole of the operation surface 13.

A-7. Determination of Contact/Non-Contact and Coordinate of Tip Position

Then, by executing a process using the first area image and the second area image clipped in the step S7 as input, whether or not the pointing element 80 has contact with the operation surface 13 is determined with high accuracy, and the coordinate of the tip position of the pointing element 80 is detected.

Figure 23:
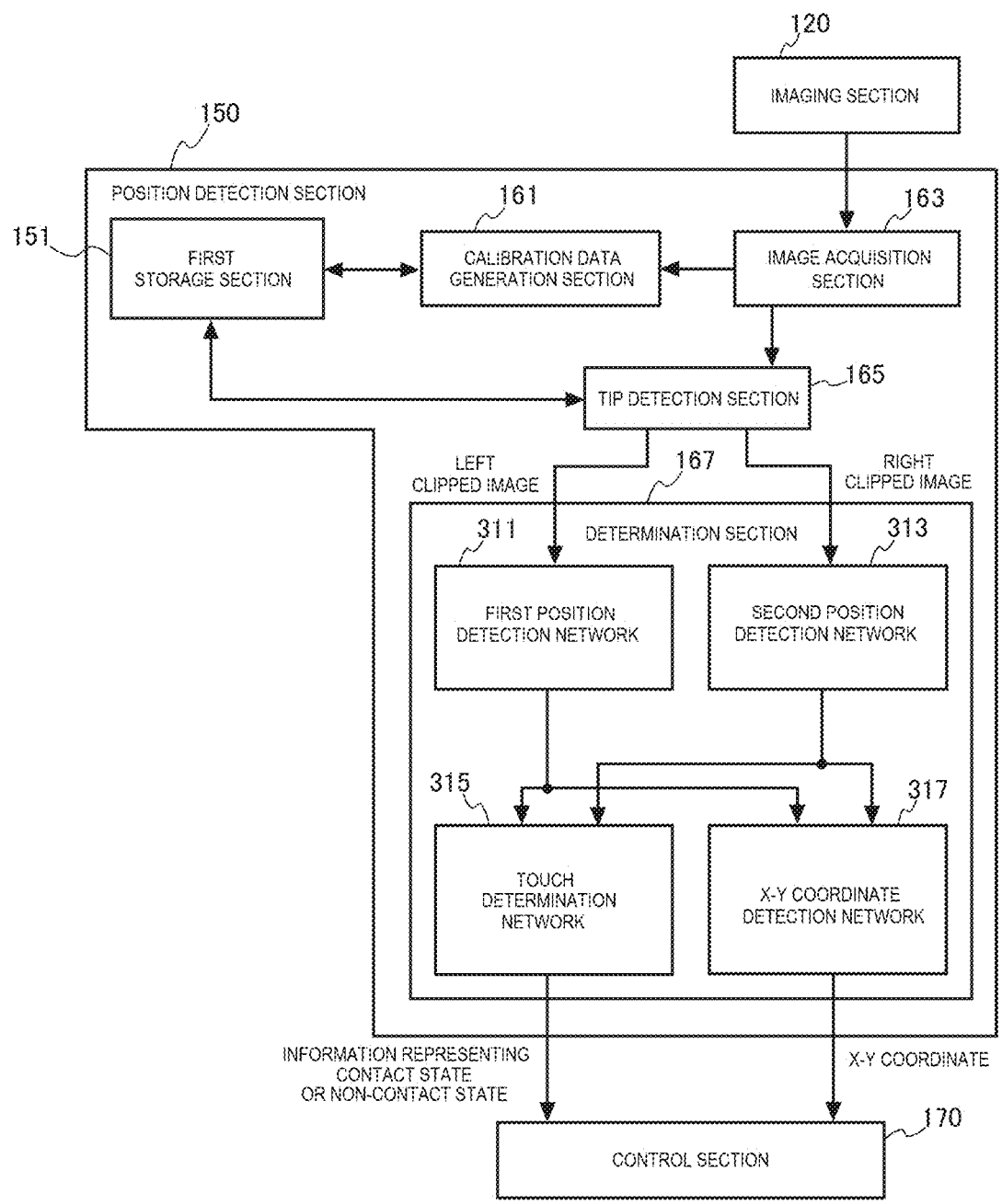
FIG. 23 is a block diagram showing a configuration of a position detection section.

FIG. 23 is a diagram showing a detailed configuration of the determination section 167.

The determination section 167 executes the processes corresponding to the step S8 and the step S9 shown in FIG. 5. The determination section 167 is provided with a first position detection network 311, a second position detection network 313, a touch determination network 315, and an X-Y coordinate detection network 317.

The first position detection network 311 is an AI (Artificial Intelligence), and is constituted by software constituting the learned neural network, or software and hardware. The first position detection network 311 in the present embodiment is provided with a convolution neural network as the learned neural network. To the first position detection network 311, there is input the left clipped image 241 from the tip detection section 165. The first position detection network 311 inputs the left clipped image 241 to the neural network, and outputs information representing the position of the fingertip in the left clipped image 241, namely the coordinate of the left clipped image 241 representing the position of the fingertip.

The second position detection network 313 is an AI, and is constituted by software constituting the learned neural network, or software and hardware. The second position detection network 313 in the present embodiment is provided with a convolution neural network as the learned neural network. To the second position detection network 313, there is input the right clipped image 243 from the tip detection section 165. The second position detection network 313 inputs the right clipped image 243 to the neural network, and outputs information representing the position of the fingertip in the right clipped image 243, namely the coordinate of the right clipped image 243 representing the position of the fingertip.

The touch determination network 315 is an AI, and is constituted by software constituting the learned neural network, or software and hardware. The touch determination network 315 in the present embodiment is provided with a convolution neural network as the learned neural network. To the touch determination network 315, there is input information representing the position of the fingertip from the first position detection network 311 and the second position detection network 313. The touch determination network 315 inputs the information representing the position of the fingertip to the neural network, and outputs a determination result of the determination on whether or not the fingertip has contact with the operation surface 13. When the touch determination network 315 has determined that the fingertip has contact with the operation surface 13, the touch determination network 315 outputs information representing the contact state, and when the touch determination network 315 has determined that the fingertip does not have contact with the operation surface 13, the touch determination network 315 outputs information representing the non-contact state. The touch determination network 315 outputs the information representing the contact state or the information representing the non-contact state to the control section 170. Thus, the contact of the pointing element 80 to the operation surface 13 is detected at high speed and with high accuracy.

The X-Y coordinate detection network 317 is an AI, and is constituted by software constituting the learned neural network, or software and hardware. The X-Y coordinate detection network 317 in the present embodiment is provided with a convolution neural network as the learned neural network. To the X-Y coordinate detection network 317, there is input information representing the position of the fingertip from the first position detection network 311 and the second position detection network 313. The X-Y coordinate detection network 317 inputs the information representing the position of the fingertip to the neural network, and outputs coordinate information representing the position in the operation surface 13 of the fingertip. In other words, the X-Y coordinate detection network 317 outputs the coordinate values representing the coordinate set in advance to the operation surface 13 based on the coordinates of the left clipped image 241 and the right clipped image 243. The X-Y coordinate detection network 317 outputs the coordinate values representing the coordinate in the operation surface 13 to the control section 170. Thus, the pointing position in the operation surface 13 by the pointing element 80 is detected at high speed and with high accuracy.

Further, to the control section 170, there are input the information representing the contact state or the non-contact state and the coordinate values representing the coordinate in the operation surface 13 from the position detection section 150. The control section 170 executes the process corresponding to the step S10 shown in FIG. 5.

B-1. Modified Example 1

When the user performs an operation using a finger of the user as the pointing element 80, the operation is often performed by making a ball of the finger have contact with the operation surface instead of the tip of the pointing element 80. Therefore, when the operation is performed using the finger of the user as the pointing element 80, it is also possible for the position detection section 150 to identify the position of the ball of the finger to detect the position of the ball thus identified as the operation position 295 of the pointing element 80. This process will be described with reference to the flowchart shown in FIG. 24.

Figure 24:
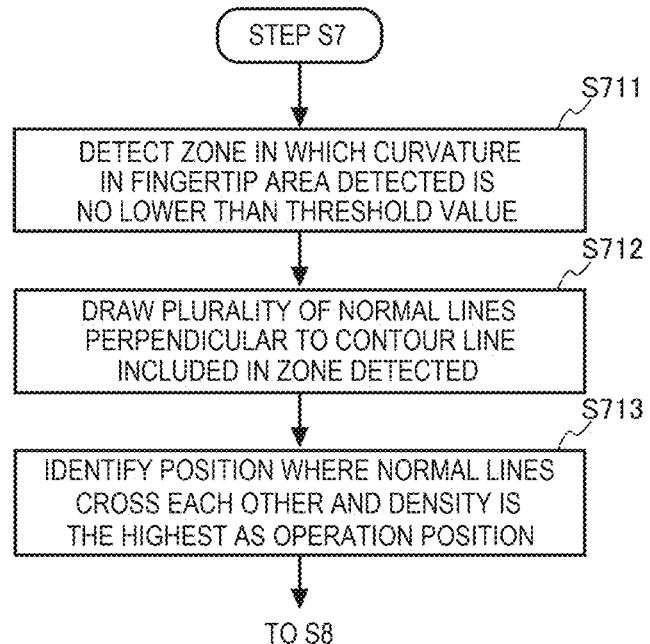
FIG. 24 is a flowchart showing an operation of the position detection section for detecting a position of a ball of a finger.

FIG. 24 is a flowchart showing the operation of the position detection section 150 for detecting the position of the ball of the finger.

Firstly, the position detection section 150 determines the first change area 250A where an image remains unremoved as the fingertip area 270 in the first difference image 240A ½ in resolution. Then, the position detection section 150 detects (step S711) the zone where the curvature is no lower than a threshold value out of the contour line constituting the fingertip area 270.

Figure 25:
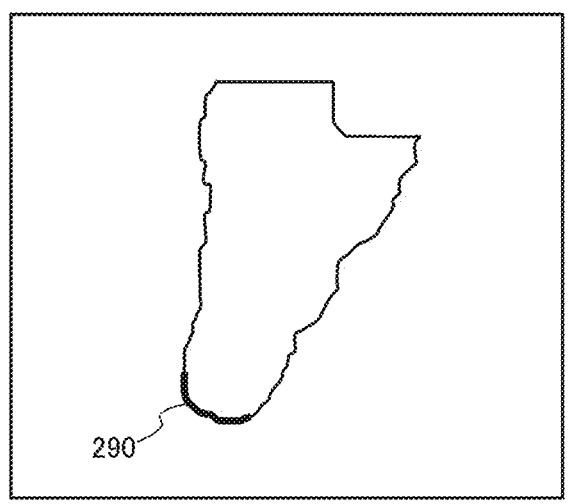
FIG. 25 is a diagram showing a zone in which the curvature is no lower than a threshold value.

FIG. 25 is a diagram showing the zone 290 where the curvature is no lower than the threshold value is shown.

When the position detection section 150 has detected the zone where the curvature is no lower than the threshold value, the position detection section 150 draws (step S712) a plurality of normal lines perpendicular to the contour line included in the zone 290 thus detected in the first difference image 240A.

Figure 26:
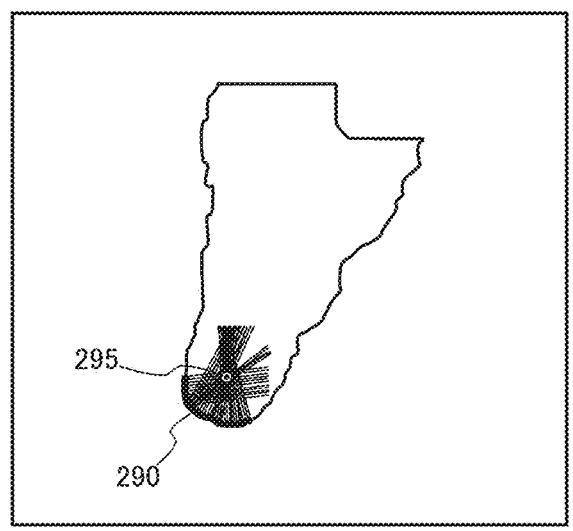
FIG. 26 is a diagram showing a state in which a plurality of normal lines perpendicular to the contour line is drawn.

FIG. 26 is a diagram showing the plurality of normal lines perpendicular to the contour line is drawn. When the position detection section 150 has drawn the plurality of normal lines perpendicular to the contour line, the position detection section 150 identifies (step S713) the position where the normal lines cross each other to be the highest in density as the operation position 295 of the pointing element 80.

B-2. Modified Example 2

It is also possible to perform learning step on the first position detection network 311, the second position detection network 313, the touch determination network 315, and the X-Y coordinate detection network 317 provided to the position detection section 150 described above. In the learning step, learning is performed inputting the taken images taken by the first camera 121 and the second camera 123 to the respective neural networks as a learning data set in the state in which the irradiation with the infrared light is performed from a direction different from that of the detection light irradiation section 130. The learning data set includes a plurality of first taken images and second taken images different in infrared light from each other. For example, the infrared light is projected on the projection surface 10 from a first direction different from that of the detection light irradiation section 130 using a movable infrared light source different from the detection light irradiation section 130, and then the first camera 121 and the second camera 123 are made to perform imaging to obtain the taken images. By executing this process a plurality of number of times while changing the position of the infrared light source, there are obtained the taken images of the projection surfaces 10 irradiated with the infrared light from a second direction, a third direction, a fourth direction, . . . , different from each other. It is sufficient to execute the learning by inputting the learning data set including the plurality of taken images to the neural networks. Further, the position and the coordinate of the finger or the fingertip as the pointing element 80, and the determination result on whether or not the pointing element 80 has contact are previously added to the learning data set as labels, and the neural networks are made to perform supervised learning.

By the position detection section 150 executing the learning step, even when the irradiation direction with the infrared light is changed, it is possible to keep the accuracy of the determination on the pointing position of the pointing element 80 and whether or not the pointing element 80 has had contact with the operation surface 13.

This learning step can be executed before the step S1 in the flowchart shown in FIG. 5 described above, but can also be executed before installing the learned neural network in the position detection section 150. Further, it is also possible to execute the learning step in a different device from the projector 100 to make the learned neural network, and then install the learned neural network in the projector 100.

As described hereinabove, the position detection device 200 according to the present embodiment is provided with the control section 170 and the position detection section 150. The control section 170 makes the detection light irradiation section 130 perform irradiation with the infrared light in a direction corresponding to the operation surface 13. The position detection section 150 is provided with the tip detection section 165 and the determination section 167.

The tip detection section 165 obtains the left taken image and the right taken image taken by the imaging section 120.

The left taken image and the right taken image are taken images obtained by imaging the operation surface 13 with the first camera 121 and the second camera 123 different in imaging viewpoint from each other, and are the images taken using the infrared light.

The tip detection section 165 forms the left rectangular image 235 and the right rectangular image 237 calibrated with respect to the operation surface 13 based on the left taken image and the right taken image thus obtained.

Particularly, the area in which the amount of the disparity between the left rectangular image 235 and the right rectangular image 237 is within a predetermined range out of the difference image 240 formed by subtracting the right taken image from the left taken image is extracted by the tip detection section 165 as the change area 250 in which the image of the pointing element 80 is included. Further, the tip detection section 165 detects the area corresponding to the tip of the pointing element 80 from the change area 250 thus extracted based on the shape of the pointing element 80.

The determination section 167 outputs the information representing the pointing position of the pointing element 80 in the operation surface 13 and whether or not the pointing element 80 had contact with the operation surface 13 based on the detection result in the tip detection section 165.

Therefore, it is possible to detect the tip of the pointing element 80 based on the taken images obtained by imaging the operation surface 13 with the stereo camera to output the information representing the pointing position of the pointing element 80 in the operation surface 13, and whether or not the pointing element 80 had contact with the operation surface 13. Further, by taking the images with the infrared light using the first camera 121 and the second camera 123, it is possible to identify the pointing element 80 having contact with the operation surface 13 without the false detection reducing the influence of the image light displayed on the operation surface 13, the illumination, the outside light, and so on. It is possible to extract the area corresponding to the tip of the pointing element 80 thus identified from each of the taken images taken by the first camera 121 and the second camera 123 to output the information representing the pointing position of the pointing element 80 and whether or not the pointing element 80 had contact with the operation surface 13. Thus, the contact of the pointing element 80 to the operation surface 13, and the pointing position in the operation surface 13 by the pointing element 80 are detected at high speed and with high accuracy.

Further, the tip detection section 165 forms the first difference image 240A lower in resolution than the difference image 240, and the second difference image 240B lower in resolution than the first difference image 240A.

The tip detection section 165 superimposes the figure 300 having a predetermined size on the second change area 250B in the second difference image 240B to remove the second difference image 240B in the second change area 250B which the figure 300 fits into.

Further, the tip detection section 165 removes the image in the first difference image 240A corresponding to the area where the image is removed in the second difference image 240B.

The tip detection section 165 superimposes the figure 300 on the first change area 250A in the first difference image 240A, then removes the difference image in the first change area 250A which the figure 300 fits into, and then detects the tip of the pointing element 80 based on the area where the difference image remains.

Therefore, it is possible to improve the detection accuracy for the tip of the pointing element 80.

Further, the determination section 167 inputs the left clipped image 241 corresponding to the change area 250 and the right clipped image 243 corresponding to the change area 250 to the learned neural network to detect the information representing the pointing position of the pointing element 80 in the operation surface 13 and whether or not the pointing element 80 had contact with the operation surface 13.

Therefore, it is possible to improve the accuracy of the determination on the pointing position of the pointing element 80 and whether or not the pointing element 80 had contact with the operation surface 13.

Further, the determination section 167 includes the X-Y coordinate detection network 317 as the learned neural network for detecting the pointing position coordinate. The determination section 167 executes the process of inputting the data representing the position of the pointing element 80 which can be obtained from the left clipped image 241 and the data representing the position of the pointing element 80 which can be obtained from the right clipped image 243 to the X-Y coordinate detection network 317 to obtain the coordinate of the pointing position.

Further, the determination section 167 includes the touch determination network 315 as the learned neural network for the contact determination. The determination section 167 executes the process of inputting the data representing the position of the pointing element 80 obtained from the left clipped image 241 and the data representing the position of the pointing element 80 obtained from the right clipped image 243 to the touch determination network 315 to determine whether or not the pointing element 80 had contact with the operation surface 13.

Therefore, the determination of the pointing position of the pointing element 80 and whether or not the pointing element 80 had contact with the operation surface 13 is performed based on the separate learned neural networks respectively prepared for detecting the pointing position coordinate and for the contact determination. Therefore, it is possible to further improve the accuracy of the determination on the pointing position of the pointing element 80 and whether or not the pointing element 80 had contact with the operation surface 13.

The embodiment described above is a preferred embodiment of the present disclosure. It should be noted that the present disclosure is not limited to the embodiment, but a variety of modifications can be adopted within the scope or the spirit of the present disclosure.

For example, although in the embodiment described above, there is described the configuration of the position detection device 200 provided with the position detection section 150 and the control section 170, it is also possible to make the position detection section 150 alone act as the position detection device 200.

Further, although in the embodiment described above, there is described the configuration in which the projector 100 is provided with the imaging section 120, it is also possible to dispose the imaging section 120 as a separate body from the projector 100. Further, although in the embodiment described above, there is described the configuration in which the projector 100 is provided with the detection light irradiation section 130, it is also possible to dispose the detection light irradiation section 130 as a separate body from the projector 100. For example, it is also possible to configure the imaging section 120 as an imaging device operating alone, and to couple the imaging device and the projector 100 wirelessly or with wire to each other. For example, it is also possible to configure the detection light irradiation section 130 as a detection light irradiation device operating alone, and to couple the detection light irradiation device and the projector 100 to each other wirelessly or with wire. In this case, the imaging device, the detection light irradiation device, and the position detection device 200 function as devices constituting the position detection system according to the present disclosure.

Further, although in the embodiment described above, there is described the position detection device system having a configuration in which the projector 100 is a display device, it is also possible to use a flat panel display (FPD) as the display device. In this case, it is also possible to configure the position detection system or the display system by using the display section of the FPD as the operation surface 13, and disposing the position detection device 200 in accordance with the display section of the FPD.

Further, each of the functional sections of the projector 100 shown in FIG. 3 is for showing the functional configuration, and the specific mounting forms are not particularly limited. In other words, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiments described above can also be realized by hardware, and a part of the function realized by hardware can also be realized by software. Besides the above, the specific detailed configuration of each of other sections than the projector can arbitrarily be modified within the scope or the spirit of the present disclosure.

Further, the processing units of the flowcharts shown in FIG. 5, FIG. 8, FIG. 18, and FIG. 24 are obtained by dividing the process of the projector 100 in accordance with major processing contents in order to make the process of the projector 100 easy to understand. The scope of the present disclosure is not limited by the way of the division or the names of the processing units shown in the flowcharts of FIG. 5, FIG. 8, FIG. 18, and FIG. 24. Further, the process of the control section 170 and the position detection section 150 can also be divided into a larger number of processing units, or can also be divided so that one processing unit includes a larger amount of process in accordance with the processing contents. Further, the processing sequence of the flowchart described above is not limited to the illustrated example.

Further, when realizing the position detection method using a computer provided to the projector 100, it is also possible to configure the program to be executed by the computer as an aspect of a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk. an HDD (Hard Disk Drive), a CD-ROM, a DVD, a Blu-ray disc, a magnetooptic disc, a flash memory, or a card-type recording medium. Further, the recording medium described above can also be a RAM, or a nonvolatile storage device such as a ROM or the HDD as an internal storage device provided to the server device. Blu-ray is a registered trademark.

What is claimed is:

1. A position detection method of detecting a position in an operation surface pointed by a pointing element, the method comprising:

irradiating with infrared light toward the operation surface;

obtaining a first taken image calibrated with respect to the operation surface by imaging the operation surface with a first camera configured to take an image with the infrared light;

obtaining a second taken image calibrated with respect to the operation surface by imaging the operation surface with a second camera different in imaging viewpoint from the first camera and configured to take an image with the infrared light;

forming a difference image between the first taken image and the second taken image;

extracting an area in which an amount of disparity between the first taken image and the second taken image is within a predetermined range out of the difference image as a candidate area in which an image of the pointing element is included;

detecting an area corresponding to a tip position of the pointing element from the candidate area extracted based on a shape of the pointing element; and outputting, based on the area corresponding to a tip position, information representing a pointing position of the pointing element in the operation surface and whether or not the pointing element had contact with the operation surface.

2. The position detection method according to claim 1, further comprising:

determining the information by inputting a first area image of the first taken image corresponding to the candidate area and a second area image of the second taken image corresponding to the candidate area to a learned neural network.

3. The position detection method according to claim 2, wherein the determining the information includes determining the pointing position coordinate to obtain a coordinate of the pointing position by inputting data representing a position of the pointing element obtained from the first area image and data representing a position of the pointing element obtained from the second area image to the learned neural network, and determining whether or not the pointing element had contact with the operation surface by inputting the data representing the position of the pointing element obtained from the first area image and the data representing the position of the pointing element obtained from the second area image to the learned neural network.

4. The position detection method according to claim 2, further comprising:

making the learned neural network by inputting a plurality of the first taken images different in irradiation direction of the infrared light from each other and the second taken images different in irradiation direction of the infrared light from each other to a neural network.

5. The position detection method according to claim 1, wherein the detecting the area corresponding to the tip position includes forming a first difference image having lower resolution than the difference image, and a second difference image having lower resolution than the first difference image, removing a part of the second difference image in the candidate area in the second difference image which a figure having a predetermined size fits into by superimposing the figure on the candidate area in the second difference image, removing an image in an area in the first difference image corresponding to the area where the image is removed in the second difference image, removing a part of the first difference image in the candidate area in the first difference image which the figure fits into by superimposing the figure on the candidate area in the first difference image, and detecting a tip of the pointing element based on an area where the first difference image remains.

6. A position detection device configured to detect a position in an operation surface pointed by a pointing element, the position detection device comprising:

a first processor configured to irradiate with infrared light toward the operation surface; and a second processor configured to obtain a first taken image calibrated with respect to the operation surface by imaging the operation surface with a first camera and configured to take an image with the infrared light, obtain a second taken image calibrated with respect to the operation surface by imaging the operation surface with a second camera different in imaging viewpoint from the first camera and configured to take an image with the infrared light, form a difference image between the first taken image and the second taken image, extract an area in which an amount of disparity between the first taken image and the second taken image is within a predetermined range out of the difference image as a candidate area in which an image of the pointing element is included, detect an area corresponding to a tip position of the pointing element from the candidate area extracted based on a shape of the pointing element;

output, based on the area corresponding to a tip position, information representing a pointing position of the pointing element in the operation surface and whether or not the pointing element had contact with the operation surface.

7. A position detection system comprising:

a first camera configured to take an image with infrared light;

a second camera different in imaging viewpoint from the first camera and configured to take an image with infrared light;

a detection light irradiation device configured to irradiate with the infrared light toward an operation surface; and a position detection device including a processor configured to obtain a first taken image which is obtained by imaging the operation surface with the first camera and is calibrated with respect to the operation surface, obtain a second taken image which is obtained by imaging the operation surface with the second camera and is calibrated with respect to the operation surface, form a difference image between the first taken image and the second taken image, extract an area in which an amount of disparity between the first taken image and the second taken image is within a predetermined range out of the difference image as a candidate area in which an image of a pointing element configured to perform an operation on the operation surface is included, detect an area corresponding to a tip position of the pointing element from the candidate area extracted based on a shape of the pointing element;

output, based on the area corresponding to a tip position, information representing a pointing position of the pointing element in the operation surface and whether or not the pointing element had contact with the operation surface.

* * * * *